US008181514B2

(12) United States Patent
Ariyoshi et al.

(10) Patent No.: US 8,181,514 B2
(45) Date of Patent: *May 22, 2012

(54) FLOW RATE MEASURING APPARATUS INCLUDING A RECESS FOR CHANGING AIR FLOW DIRECTION

(75) Inventors: Yuji Ariyoshi, Tokyo (JP); Hiroyuki Uramachi, Tokyo (JP); Masahiro Kawai, Tokyo (JP); Naruki Suetake, Tokyo (JP); Koji Tanimoto, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/029,535

(22) Filed: Feb. 17, 2011

(65) Prior Publication Data

US 2011/0132101 A1    Jun. 9, 2011

Related U.S. Application Data

(63) Continuation of application No. 12/351,602, filed on Jan. 9, 2009, now Pat. No. 7,942,052.

(30) Foreign Application Priority Data

Jul. 2, 2008    (JP) ................................. 2008-173693

(51) Int. Cl.
    *G01F 1/68*    (2006.01)
(52) U.S. Cl. .................... 73/202.5; 73/204.22
(58) Field of Classification Search .......... None
    See application file for complete search history.

(56) References Cited

U.S. PATENT DOCUMENTS

| | | | |
|---|---|---|---|
| 5,563,340 | A | 10/1996 | Clowater et al. |
| 5,631,415 | A | 5/1997 | Igarishi et al. |
| 5,696,321 | A | 12/1997 | Igarishi et al. |
| 5,712,425 | A | 1/1998 | Hecht et al. |
| 5,948,975 | A | 9/1999 | Mueller et al. |
| 6,345,531 | B1 | 2/2002 | Mueller et al. |
| 6,612,167 | B2 | 9/2003 | Kamiya |
| 6,810,730 | B2 | 11/2004 | Lenzing et al. |
| 7,162,920 | B2 | 1/2007 | Konzelmann et al. |
| 7,260,986 | B2 | 8/2007 | Lenzing et al. |
| 7,360,414 | B2 | 4/2008 | Konzelmann et al. |
| 7,530,267 | B2 | 5/2009 | Uramachi |

(Continued)

FOREIGN PATENT DOCUMENTS

DE            4441874 A1    5/1996

(Continued)

OTHER PUBLICATIONS

Japanese Office Action dated Oct. 5, 2010 issued in corresponding Japanese Application No. 2008-173693.

*Primary Examiner* — Harshad Patel
(74) *Attorney, Agent, or Firm* — Sughrue Mion, PLLC

(57) ABSTRACT

An inflow port and an outflow port of a bypass passage have openings on a front surface near a projecting end and on a bottom surface, respectively, of a bypass passage forming member. A recess portion is disposed on the front surface of the bypass passage forming member on a circuit housing portion side of the inflow port so as to extend at a predetermined depth over an entire region in a longitudinal direction of a short side of a rectangular cross section of the bypass passage forming member.

10 Claims, 19 Drawing Sheets

U.S. PATENT DOCUMENTS

| | | | |
|---|---|---|---|
| 7,712,361 B2 * | 5/2010 | Uramachi | 73/204.22 |
| 7,942,052 B2 * | 5/2011 | Ariyoshi et al. | 73/202.5 |
| 2003/0196486 A1 | 10/2003 | Zurek et al. | |
| 2004/0134272 A1 | 7/2004 | Pesahl et al. | |
| 2004/0163460 A1 | 8/2004 | Myers et al. | |
| 2007/0062275 A1 | 3/2007 | Beyrich et al. | |
| 2007/0068246 A1 | 3/2007 | Uramachi | |
| 2011/0138927 A1 * | 6/2011 | Ariyoshi et al. | 73/861 |

FOREIGN PATENT DOCUMENTS

| | | |
|---|---|---|
| DE | 10118415 A1 | 10/2001 |
| DE | 10217884 A1 | 11/2003 |
| DE | 10348400 A1 | 2/2005 |
| DE | 102006012929 A1 | 4/2007 |
| JP | 2846207 B2 | 10/1998 |
| JP | 2002-503349 A | 1/2002 |
| JP | 2002005713 A | 1/2002 |
| JP | 2002122453 A | 4/2002 |
| JP | 3602762 B2 | 10/2004 |
| JP | 2006-153694 A | 6/2006 |
| JP | 2006522917 A | 10/2006 |
| JP | 3877777 B2 | 11/2006 |
| JP | 2007-93422 A | 4/2007 |
| JP | 2007-327790 A | 12/2007 |

* cited by examiner

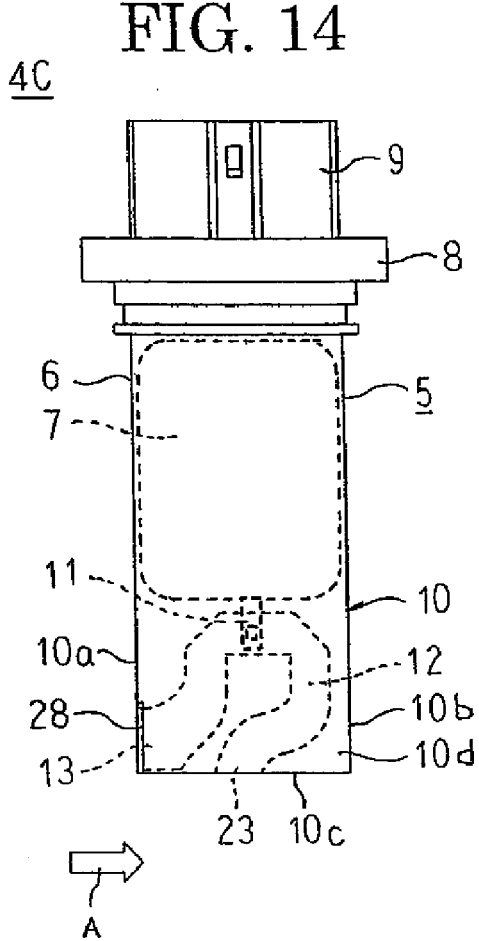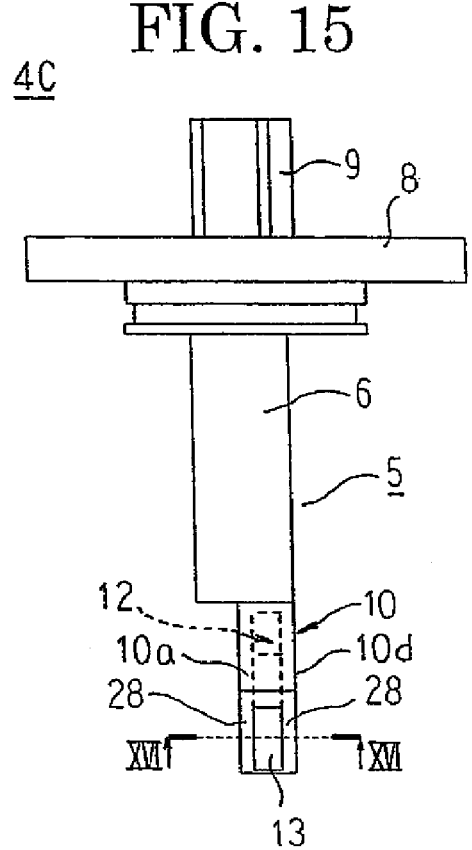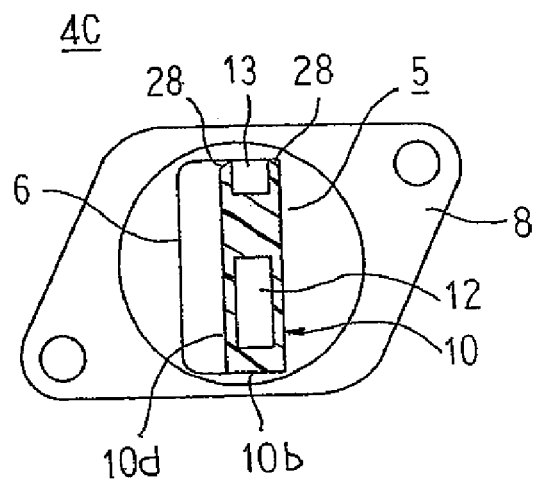

FIG. 34
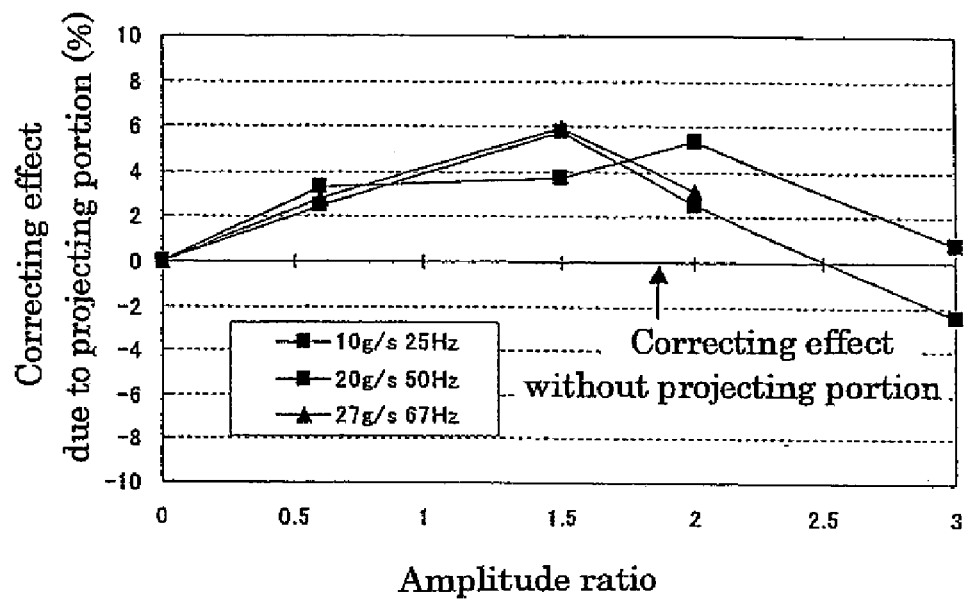
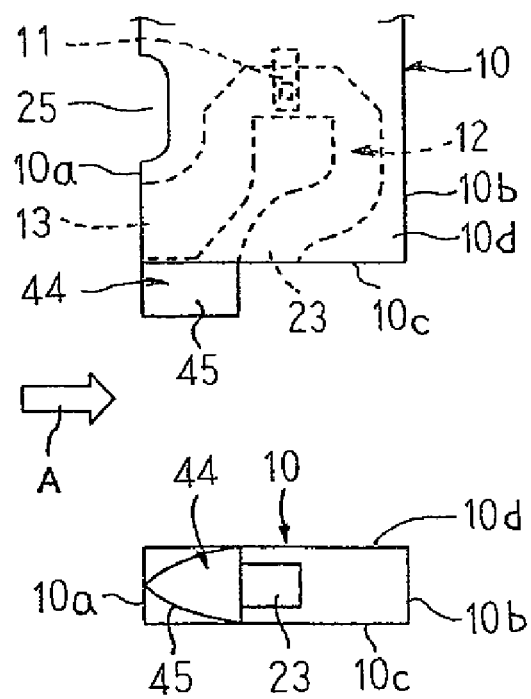
FIG. 35A
FIG. 35B

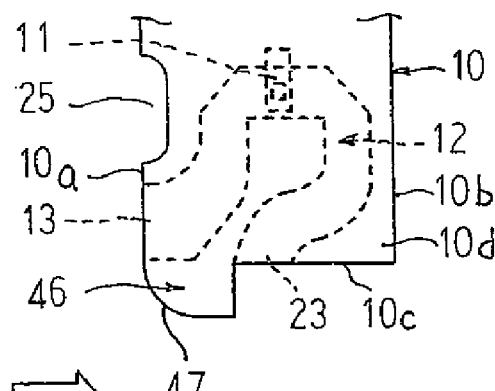
FIG. 36A
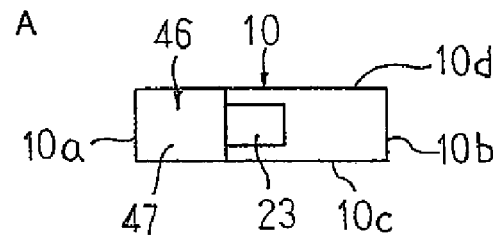
FIG. 36B
FIG. 37
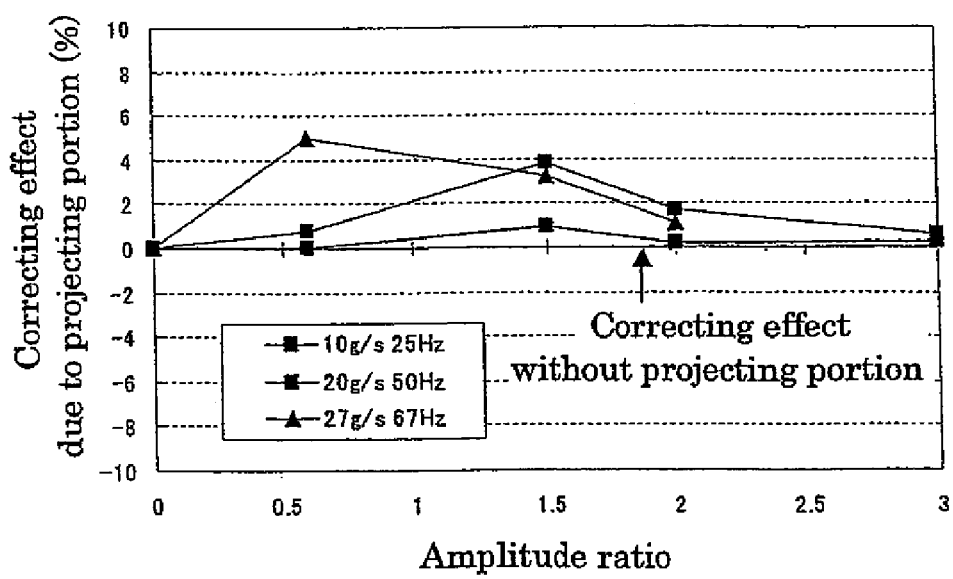

FIG. 44
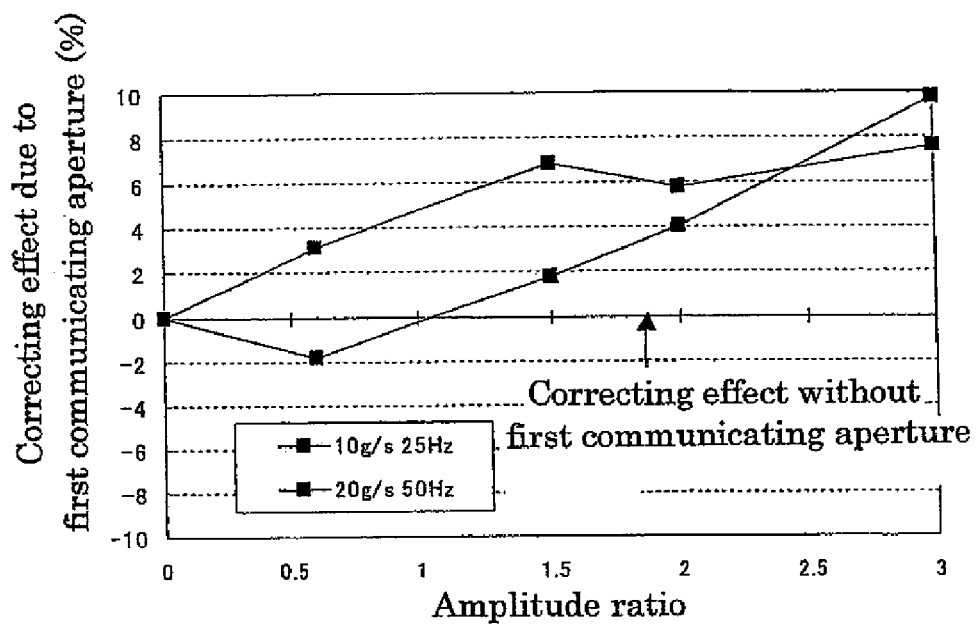
FIG. 45
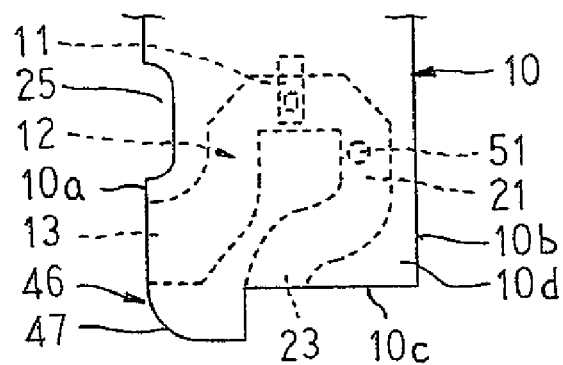
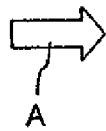
FIG. 46
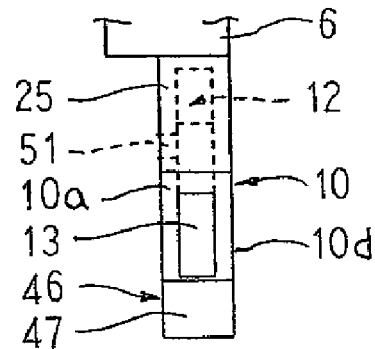

FLOW RATE MEASURING APPARATUS INCLUDING A RECESS FOR CHANGING AIR FLOW DIRECTION

CROSS REFERENCE TO RELATED APPLICATIONS

This application is a continuation of U.S. patent application Ser. No. 12/351,602 filed Jan. 9, 2009, which claims priority from Japanese Patent Application No. 2008-173693 filed Jul. 2, 2008, the contents of which applications are incorporated herein by reference in their entirety.

BACKGROUND OF THE INVENTION

1. Field of the Invention

The present invention relates to a flow rate measuring apparatus that measures intake air flow in an internal combustion engine, for example.

2. Description of the Related Art

In conventional flow rate measuring apparatuses, a circuit housing portion in which a sensor body is disposed on a leading end portion is disposed so as to project into a main passage, a passage forming member that forms a bypass passage that bypasses the main passage and allows a portion of intake air to flow through is mounted to a projecting end of the sensor body, and a flow rate detecting element is disposed partway along the bypass passage so as to be electrically connected to a circuit portion that is housed inside a circuit housing portion. The bypass passage includes: an inflow port that has an opening that faces upstream relative to a direction of flow of the intake air on a front surface portion of the passage forming member; an outflow port that has an opening on a side surface of the passage forming member; and a passage portion that bends a plurality of times from the inflow port to the outflow port. A heater is formed on the flow rate detecting element, electric current is supplied to the heater from the circuit portion to generate heat, and the flow rate of the intake air is detected as a change in resistance that corresponds to temperature due to the heater being cooled by coming onto contact with a measured fluid that flows over its surface (see Patent Literature 1, for example).

In flow rate measuring apparatuses of this kind that detect flow rate of intake air as a change in resistance that corresponds to temperature, lean errors in which detected values of the average flow rate of intake air are less than the true average flow rate occur if the flow of intake air pulsates, due to thermal response lag and nonlinear output characteristics of the flow rate detector portion.

In conventional flow rate measuring apparatuses, these lean errors are corrected by using the bypass passage. Specifically, pressure fluctuations occur in the bypass passage that are accompanied by a lag compared to pressure fluctuations at the inflow port and the outflow port of the bypass passage, and lean errors are corrected thereby since the average flow rate of the intake air increases. This effect of increasing the average flow rate of the intake air using the bypass passage is determined by passage length of the bypass passage, length of the main passage between the inflow port and the outflow port, loss in the main passage and the bypass passage, etc., and the effect is also known to be diluted as loss in the bypass passage increases.

Patent Literature 1: Japanese Patent No. 3602762 (Gazette)

In conventional flow rate measuring apparatuses, a bulkhead portion is formed above the inflow port on the front surface of the passage forming member, and blocks the flow of intake air. Thus, flow of a portion of the intake air that has collided into the bulkhead portion above the inflow port is changed toward the inflow port and obstructs the flow of intake air that flows directly into the inflow port from upstream. This obstruction of the flow of intake air leads to a loss in the flow of intake air that flows through the bypass passage.

One problem has been that the flow velocity of the intake air that flows through the bypass passage becomes slower as this loss inside the bypass passage increases, giving rise to desensitization. Another problem has been that disturbances in the flow that are generated as a result of the smooth flow of intake air at the inflow port being obstructed reach as far as the portion where the flow rate detecting element is disposed, lowering measurement accuracy. A further problem has been that the effects that correct the lean errors that occur when pulsations occur in the flow of intake air are diluted as the loss in the bypass passage increases, preventing the lean errors from being corrected satisfactorily.

SUMMARY OF THE INVENTION

The present invention aims to solve the above problems and an object of the present invention is to provide a flow rate measuring apparatus that enables lean errors to be corrected satisfactorily during occurrences of pulsation, and that can achieve improvements in sensitivity and improvements in measurement accuracy.

In order to achieve the above object, according to one aspect of the present invention, there is provided a flow rate measuring apparatus including: a main body portion including: a circuit housing portion that projects into a main passage, and a bypass passage forming member that is disposed so as to extend from a projecting end of the circuit housing portion in a direction of projection of the circuit housing portion; a bypass passage that is formed on the bypass passage forming member and through which a portion of a measured fluid that flows through the main passage is allowed to flow; a flow rate detecting element that is disposed inside the bypass passage and that has a detecting portion on a surface; and a control circuit that is housed inside the circuit housing portion and that drives the flow rate detecting element and processes a signal therefrom. The bypass passage forming member has: a front surface that is oriented upstream in a direction of flow of a main flow of the measured fluid and that is perpendicular to the direction of flow of the main flow, and a bottom surface that is positioned at a leading end in a direction of extension from the circuit housing portion and that is parallel to the direction of flow of the main flow; and the bypass passage has: an inflow port that has an opening in a vicinity of an end portion of the front surface of the bypass passage forming member in the direction of extension of the bypass passage forming member, and an outflow port that has an opening on the bottom surface of the bypass passage forming member. A flow direction-changing means that makes the measured fluid that collides into the front surface of the bypass passage forming member flow from the front surface of the bypass passage forming member in a direction that is perpendicular to the direction of flow of the main flow and perpendicular to the direction of projection of the bypass passage forming member is formed on the front surface of the bypass passage forming member.

According to the present invention, the measured fluid that collides into the front surface of the bypass passage forming member has its direction of flow changed by the flow direction-changing means, and flows out from the front surface of the bypass passage forming member in a direction that is perpendicular to the direction of flow of the main flow and perpendicular to the direction of projection of the bypass passage forming member. Thus, a portion of the measured fluid that has collided into the front surface of the bypass passage forming member is prevented from flowing toward the inflow port, and the flow of intake air that flows directly into the inflow port from upstream end is not obstructed.

Loss of flow of the measured fluid that flows through the bypass passage is thereby suppressed, increasing the flow velocity of the measured fluid that flows through the bypass passage and achieving improvements in sensitivity, and also enabling a correcting effect by the bypass passage on lean errors during pulsation to be enhanced satisfactorily. Generation of turbulence in the flow of the measured fluid at the inflow port is also suppressed, enabling improvements in measurement accuracy to be achieved.

BRIEF DESCRIPTION OF THE DRAWINGS

FIG. 14 is a side elevation of a flow rate measuring apparatus according to Embodiment 4 of the present invention;

FIG. 15 is a front elevation of the flow rate measuring apparatus according to Embodiment 4 of the present invention;

FIG. 16 is a cross section taken along line XVI-XVI in FIG. 15 viewed from the direction of the arrows;

FIG. 34 is a graph that shows relationships between amplitude ratio and correcting effect in the flow rate measuring apparatus according to Embodiment 12 of the present invention;

FIGS. 35A and 35B are diagrams that show a vicinity of a bypass passage forming member of a flow rate measuring apparatus according to Embodiment 13 of the present invention;

FIGS. 36A and 36B are diagrams that show a vicinity of a bypass passage forming member of a flow rate measuring apparatus according to Embodiment 14 of the present invention;

FIG. 37 is a graph that shows relationships between amplitude ratio and correcting effect in the flow rate measuring apparatus according to Embodiment 14 of the present invention;

FIG. 44 is a graph that shows relationships between amplitude ratio and correcting effect in the flow rate measuring apparatus according to Embodiment 16 of the present invention;

FIG. 45 is a side elevation of a vicinity of a bypass passage forming member of a flow rate measuring apparatus according to Embodiment 17 of the present invention;

FIG. 46 is a front elevation of a vicinity of the bypass passage forming member of the flow rate measuring apparatus according to Embodiment 17 of the present invention;

DETAILED DESCRIPTION OF THE PREFERRED EMBODIMENTS

Flow rate measuring apparatuses according to preferred embodiments of the present invention will now be explained in detail with reference to the drawings.

Embodiment 1

Figure 1:
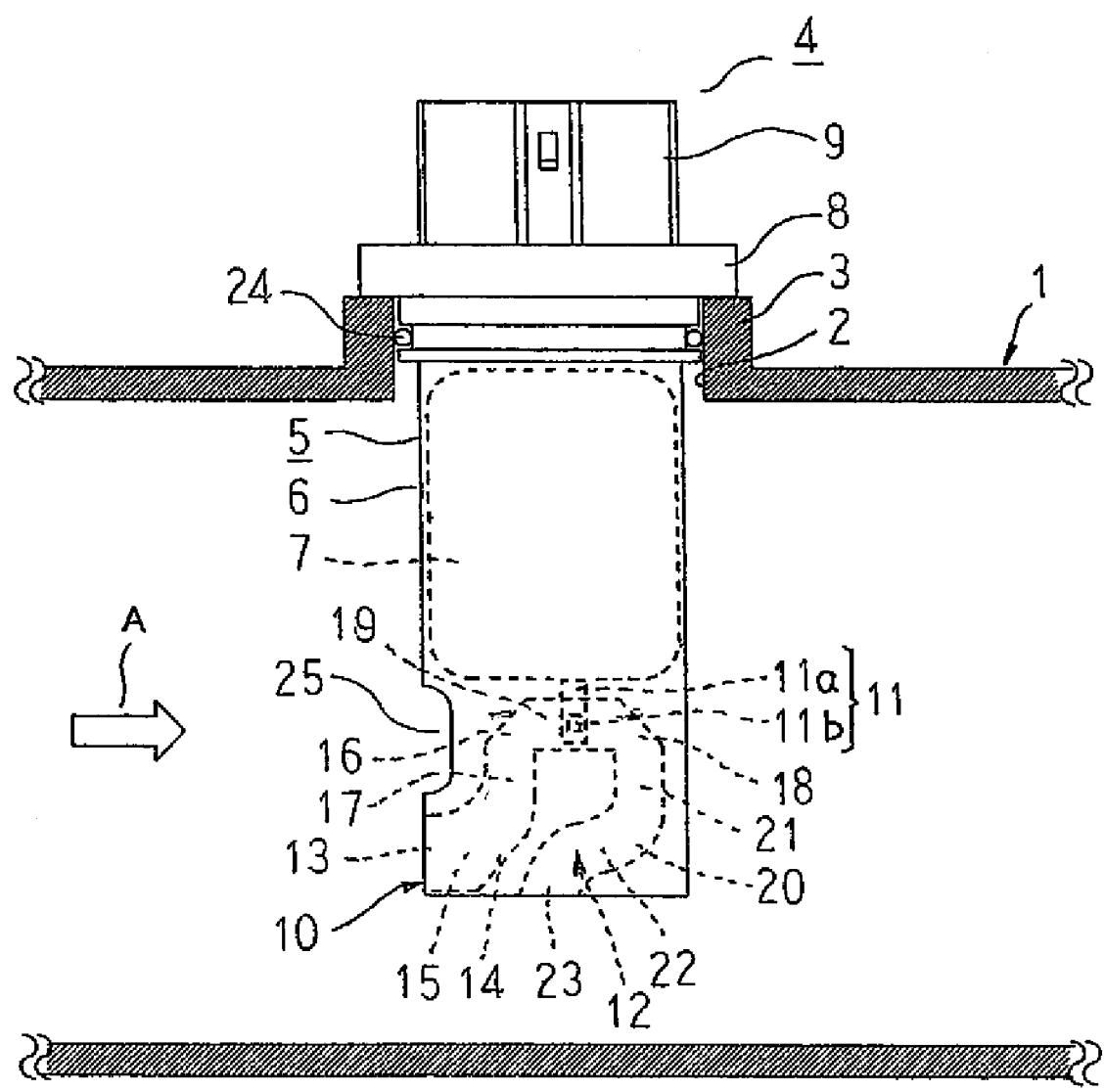
FIG. 1 is a cross section that shows a state in which a flow rate measuring apparatus according to Embodiment 1 of the present invention is mounted to a main passage.
Figure 2:
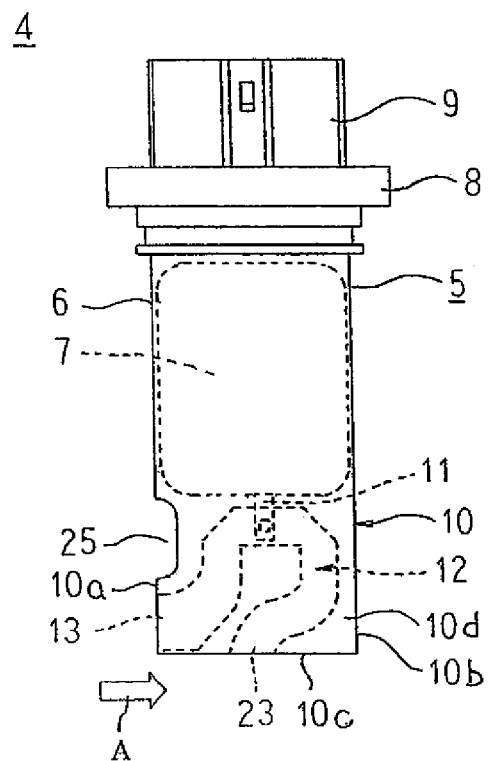
FIG. 2 is a side elevation of the flow rate measuring apparatus according to Embodiment 1 of the present invention.
Figure 3:
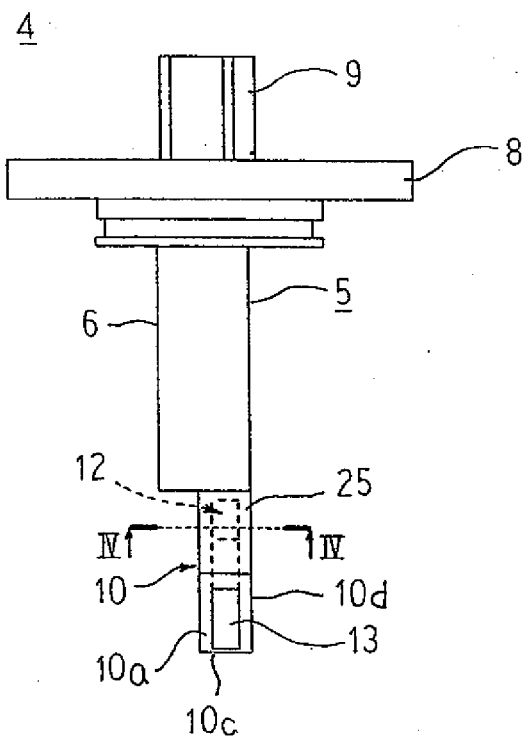
FIG. 3 is a front elevation of the flow rate measuring apparatus according to Embodiment 1 of the present invention.
Figure 4:
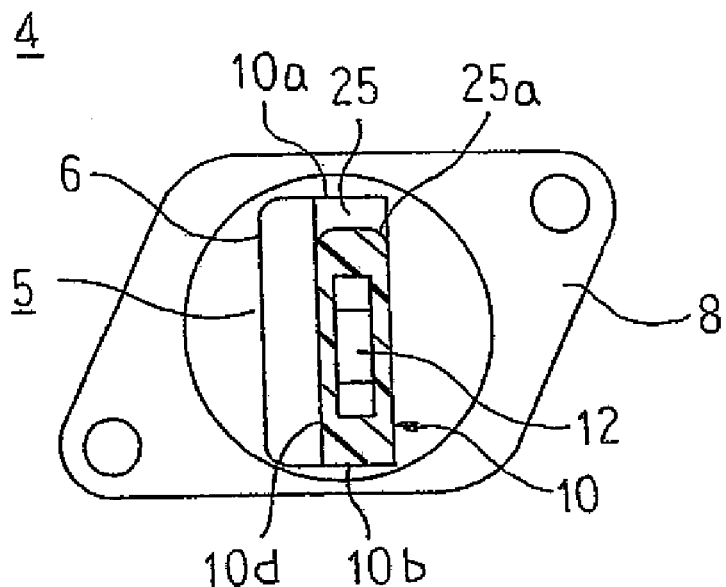
FIG. 4 is a cross section taken along line IV-IV in FIG. 3 viewed from the direction of the arrows.
Figure 6:
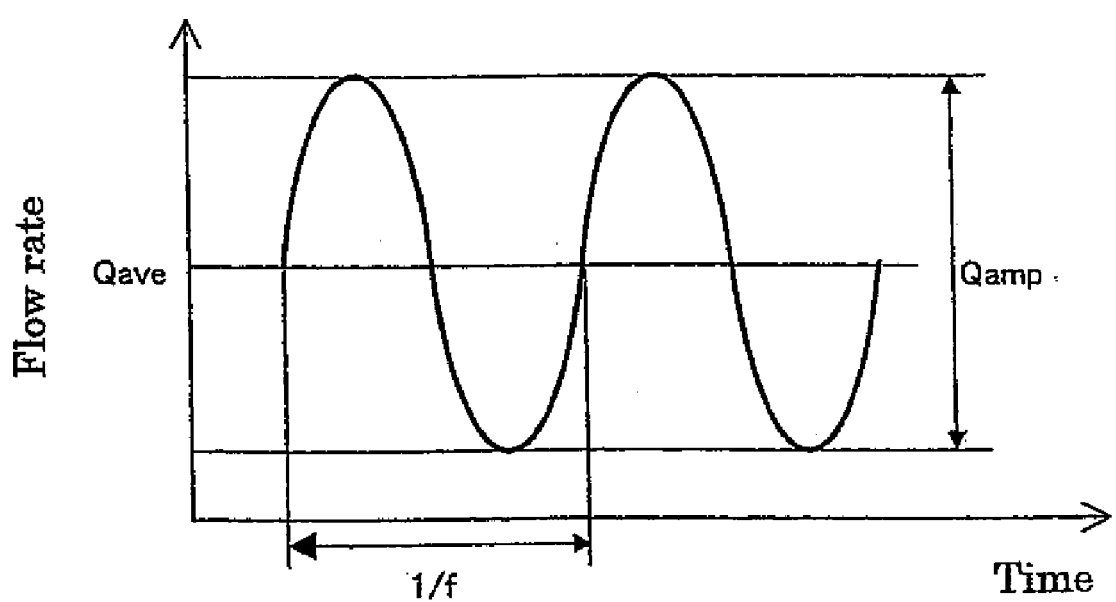
FIG. 6 is a graph that shows a waveform of a main flow during pulsation.
Figure 5A:
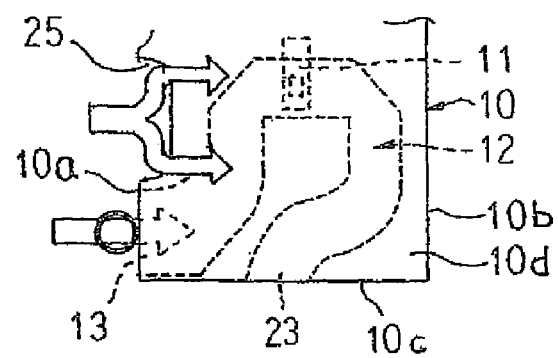
FIGS. 5A-5C are diagrams that explain effects of a recess portion in the flow rate measuring apparatus according to Embodiment 1 of the present invention.
Figure 5B:
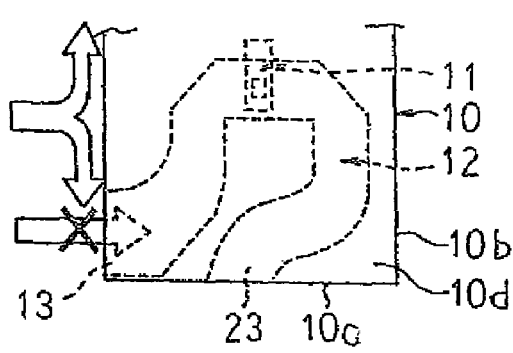
Figure 5C:
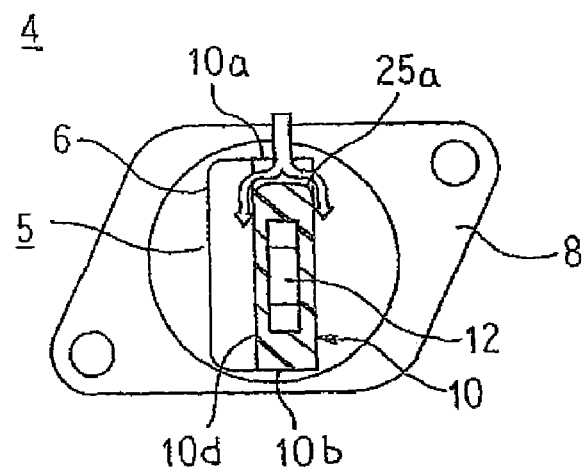
Figure 7:
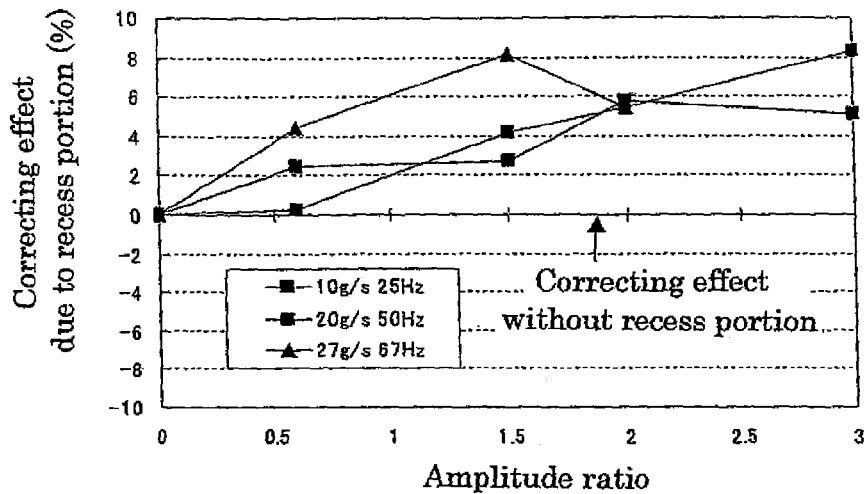
FIG. 7 is a graph that shows relationships between amplitude ratio and correcting effect in the flow rate measuring apparatus according to Embodiment 1 of the present invention.

FIG. 1 is a cross section that shows a state in which a flow rate measuring apparatus according to Embodiment 1 of the present invention is mounted to a main passage, FIG. 2 is a side elevation of the flow rate measuring apparatus according to Embodiment 1 of the present invention, FIG. 3 is a front elevation of the flow rate measuring apparatus according to Embodiment 1 of the present invention, FIG. 4 is a cross section taken along line IV-IV in FIG. 3 viewed from the direction of the arrows, FIGS. 5A-5C are diagrams that explain effects of a recess portion in the flow rate measuring apparatus according to Embodiment 1 of the present invention, FIG. 6 is a graph that shows a waveform of a main flow during pulsation, and FIG. 7 is a graph that shows relationships between amplitude ratio and correcting effect in the flow rate measuring apparatus according to Embodiment 1 of the present invention.

In FIGS. 1 through 4, a flow tube 1 that functions as a main passage is a cylindrical tube body through which a measured fluid flows, and in the case of an automotive internal combustion engine is an air intake passage normally made of a resin and configured integrally with an intake air filtration apparatus (not shown). In this case, the measured fluid is intake air. An insertion aperture 2 for plugging in a flow rate measuring apparatus 4 is disposed in the flow tube 1.

The flow rate measuring apparatus 4 has: a main body portion 5 that has: a circuit housing portion 6 that is configured into a parallelepiped that has a rectangular cross section; and a bypass passage forming member 10 that is disposed so as to extend integrally from a first end of the circuit housing portion 6; a control circuit portion 7 that is housed inside the circuit housing portion 6, and that drives a flow rate detecting element 11 and processes detection signals therefrom; a connector portion 9 for electrically connecting the control circuit portion 7 and an external portion, the connector portion being configured integrally on the main body portion 5 near the circuit housing portion 6 with a flange portion 8 interposed; and a flow rate detecting element 11 that is disposed inside a bypass passage 12 that is formed on the bypass passage forming member 10, and that detects flow rate of intake air that flows through the bypass passage 12.

The bypass passage forming member 10 is configured into a parallelepiped in which a cross section that is perpendicular to a direction of extension from the first end of the circuit housing portion 6 (a vertical direction) is rectangular. The bypass passage forming member 10 is disposed so as to extend integrally from the first end of the circuit housing portion 6 such that a front surface 10a that is constituted by a first short side of the rectangular cross section of the bypass passage forming member 10 is positioned in a common plane with a front surface of the circuit housing portion 6, a rear surface 10b that is constituted by a second short side of the rectangular cross section of the bypass passage forming member 10 is positioned in a common plane with a rear surface of the circuit housing portion 6, and a first side surface 10d that is constituted by a first long side of the rectangular cross section of the bypass passage forming member 10 is positioned in a common plane with a side surface of the circuit housing portion 6. Moreover, a length of the short sides of the rectangular cross section of the bypass passage forming member 10 is shorter than a length of short sides of the rectangular cross section of the circuit housing portion 6.

The bypass passage 12 includes: an inflow port 13 that has an opening on a lower end portion of the front surface 10a of the bypass passage forming member 10; an outflow port 23 that has an opening on a bottom surface 10c of the bypass passage forming member 10; a first passage portion 15 that extends from the inflow port 13 toward the rear surface 10b of the bypass passage forming member 10 to a first bend portion 14; a second passage portion 17 that extends from the first bend portion 14 toward the circuit housing portion 6 to the second bend portion 16; a third passage portion 19 that extends from the second bend portion 16 toward the rear surface 10b to the third bend portion 18; a fourth passage portion 21 that extends from the third bend portion 18 away from the circuit housing portion 6 to the fourth bend portion 20; and a fifth passage portion 22 that extends from the fourth bend portion 20 toward the front surface 10a and is connected to the outflow port 23.

A recess portion 25 that functions as a flow direction-changing means is disposed on the front surface 10a of the bypass passage forming member 10 above the inflow port 13 (near the circuit housing portion 6) so as to extend at a predetermined depth over an entire region in a length direction of the short side of the rectangular cross section (a horizontal direction) of the bypass passage forming member 10. A bottom surface of the recess portion 25 is parallel to the front surface 10a. In addition, first and second edge portions 25a of the recess portion 25 in the direction of extension, i.e., intersecting portions between the bottom surface of the recess portion 25 and the side surface 10d that is constituted by the long side of the rectangular cross section of the bypass passage forming member 10, are relieved into arc shapes.

The flow rate detecting element 11 is configured by forming a detecting portion 11b that is constituted by a flow rate detecting resistor and a temperature compensating resistor on a surface of a flat, rectangular substrate 11a, and forming input and output terminals that are electrically connected to the flow rate detecting resistor and the temperature compensating resistor at a first end of the surface of the substrate 11a. Here, the flow rate detecting resistor, the temperature compensating resistor, and the input and output terminals are formed by patterning a thermosensitive resistor film of platinum, nickel, iron-nickel alloy, etc., that has been formed on the surface of the substrate 11a. Furthermore, a region of formation of the flow rate detecting resistor is formed into a diaphragm construction by removing the substrate 11a from a rear surface to form a cavity. In addition, an electrically insulating material such as silicon or a ceramic, etc., can be used for the material of the substrate 11a. The flow rate detecting element 11 is disposed in the third passage portion 19 such that the surface of the substrate 11a is positioned in a common plane with a wall surface of the bypass passage 12, and the input and output terminals are electrically connected to the control circuit portion 7 that is housed inside the circuit housing portion 6.

A flow rate measuring apparatus 4 that is configured in this manner is mounted by inserting the circuit housing portion 6 and the bypass passage forming member 10 into the insertion aperture 2 so as to project inside the flow tube 1, and securely fastening the flange portion 8 to the flange portion 3 of the flow tube 1 using screws, etc. This flow rate measuring apparatus 4 is plugged into the flow tube 1 such that the front surface 10a of the bypass passage forming member 10 faces upstream so as to be perpendicular to a direction of flow A of a main flow of intake air that flows through the flow tube 1, and also such that the bottom surface 10c and the side surface 10d of the bypass passage forming member 10 are approximately parallel to the direction of flow A of the main flow of intake air that flows through the flow tube 1. An O ring 24 is interposed between the main body portion 5 near the circuit housing portion 6 and the insertion aperture 2 to ensure airtightness.

Here, the inflow port 13 of the bypass passage 12 has an opening on the front surface 10a, which is perpendicular to the direction of flow A of the main flow, in a vicinity of an end portion that projects inside the flow tube 1, and the outflow port 23 has an opening on the bottom surface 10c, which is parallel to the direction of flow A of the main flow and constitutes an end surface that projects inside the flow tube 1. The first passage portion 15 is disposed so as to extend from the inflow port 13 in the direction of flow A of the main flow to the first bend portion 14. The second passage portion 17 is disposed so as to extend from the first bend portion 14 in a direction that is approximately perpendicular to the direction of flow A of the main flow toward the circuit housing portion 6 to the second bend portion 16. The third passage portion 19 is disposed in close proximity to the circuit housing portion 6 so as to extend from the second bend portion 16 in the direction of flow A of the main flow to the third bend portion 18. The fourth passage portion 21 is disposed so as to extend from the third bend portion 18 in a direction that is approximately perpendicular to the direction of flow A of the main flow away from the circuit housing portion 6 to the fourth bend portion 20. The fifth passage portion 22 is disposed so as to extend from the fourth bend portion 20 in a reverse direction to the direction of flow A of the main flow to the outflow port 23.

A portion of the intake air that flows through the flow tube 1 flows into the bypass passage 12 through the inflow port 13, flows through the first passage portion 15 in the direction of flow A of the main flow, has its direction of flow deflected by approximately 90 degrees by the first bend portion 14, and flows through the second passage portion 17 in a direction that is perpendicular to the direction of flow A of the main flow. Next, the intake air has its direction of flow deflected by approximately 90 degrees by the second bend portion 16 flows through the third passage portion 19 in the direction of flow A of the main flow, and flows over the surface of the flow rate detecting element 11. Then, the intake air has its direction of flow deflected by approximately 90 degrees by the third bend portion 18, and flows through the fourth passage portion 21 in a direction that is perpendicular to the direction of flow A of the main flow. Finally, the intake air has its direction of flow deflected by approximately 90 degrees by the fourth bend portion 20, flows through the fifth passage portion 22 in a reverse direction to the direction of flow A of the main flow, and is discharged into the flow tube 1 through the outflow port 23.

External electric power is supplied from the connector portion 9 to the control circuit portion 7. This control circuit portion 7 controls an excitation current that flows to the flow rate detecting resistor such that the flow rate detecting resistor is at a predetermined temperature greater than the temperature of the intake air that is detected at the temperature compensating resistor, for example.

At that time, if the flow rate of the intake air is large, the quantity of heat transferred from the flow rate detecting resistor to the intake air increases, reducing the temperature of the flow rate detecting resistor. Then, the control circuit portion 7 increases the quantity of electric current passed to the flow rate detecting resistor so as to compensate for the quantity of heat transferred to the intake air to maintain the temperature of the flow rate detecting resistor at the predetermined temperature. Conversely, if the flow rate of the intake air decreases, the quantity of heat transferred from the flow rate detecting resistor to the intake air is reduced, and the temperature of the flow rate detecting resistor rises. Then, the control circuit portion 7 decreases the quantity of electric current passed to the flow rate detecting resistor to maintain the temperature of the flow rate detecting resistor at the predetermined temperature.

Thus, the flow rate of the intake air flowing through the bypass passage 12, which has a predetermined passage cross-sectional area, is detected by detecting the value of the excitation current flowing to the flow rate detecting resistor and outputting it as a flow rate signal for the intake air. The flow velocity of the intake air can also be similarly measured.

According to Embodiment 1, because the first bend portion 14 and the second bend portion 16 are disposed in a passage that extends from the inflow port 13 to the third passage portion 19 in which the flow rate detecting element 11 is disposed, the intake air has its direction of flow deflected by approximately 90 degrees at the first bend portion 14 and at the second bend portion 16. Here, if foreign matter such as dust, etc., is included in the intake air, the foreign matter strikes the first bend portion 14 and the second bend portion 16 and is decelerated since its inertial mass is larger. Thus, foreign matter that reaches the third passage portion 19 is sufficiently reduced in speed that even if the foreign matter were to strike the flow rate detecting element 11, its collision energy would be small, improving durability and service life of the flow rate detecting element 11.

Because the bypass passage 12 is configured so as to have a passage direction that bends at the first bend portion 14, the second bend portion 16, the third bend portion 18, and the fourth bend portion 20, the passage length from the inflow port 13 to the outflow port 23 is lengthened, enabling lean errors to be corrected during the occurrence of pulsation.

Now, if the recess portion 25 were not formed on the front surface 10a of the bypass passage forming member 10, intake air that collided into the front surface 10a would be changed to a flow that had a direction that was perpendicular to the direction of flow A of the main flow. Thus, as shown in FIG. 5B, intake air that had been changed to flow in a downward direction of the bypass passage forming member 10 would reach the inflow port 13, collide from a perpendicular direction into the flow of intake air that flows directly into the inflow port 13, and obstruct the flow of intake air that flows directly into the inflow port 13.

In Embodiment 1, the recess portion 25 is disposed on the front surface 10a of the bypass passage forming member 10 above the inflow port 13 so as to extend at a predetermined depth over an entire region in a horizontal direction of the bypass passage forming member 10. Thus, intake air that has collided into the bottom surface of the recess portion 25 and has had its flow changed to the vertical direction of the bypass passage forming member 10 cannot cross over the step of the recess portion 25, flows together with a flow of intake air that has collided into the bottom surface of the recess portion 25 and has had its flow changed to a horizontal direction of the bypass passage forming member 10, flows out from the first and second edge portions 25a of the recess portion 25, joins the main flow that is flowing through the flow tube 1, and flows downstream. Thus, as shown in FIGS. 5A and 5C (where FIG. 5C illustrates the cross section of FIG. 3 taken along line IV-IV as in FIG. 4, to show the flow of the intake air changing to the horizontal direction of the bypass passage forming member 10 after colliding into the bottom surface of the recess portion 25), intake air that has collided into the bottom surface of the recess portion 25 and has had its flow changed to a downward direction of the bypass passage forming member 10 does not reach the inflow port 13, avoiding obstruction of the flow of intake air that flows directly into the inflow port 13.

Thus, the flow of intake air that flows into the inflow port 13 is not obstructed, enabling increases in loss in the flow of intake air that flows through the bypass passage 12 to be suppressed. Thus, reductions in the flow velocity of the intake air that flows through the bypass passage 12 are suppressed, enabling improvements in sensitivity. The occurrence of turbulence in the intake air that flows through the bypass passage 12 is also suppressed, enabling improvements in measurement accuracy. In addition, because increases in loss in the flow of intake air that flows through the bypass passage 12 are suppressed, lean errors that occur when pulsation occurs in the flow of intake air can be corrected satisfactorily.

Because the first and second edge portions 25a of the recess portion 25 are relieved into arc shapes, when the intake air flows through the recess portion 25 and reaches the first and second edge portions 25a, its direction of flow is turned gradually along the arc-shaped surface shape of the first and second edge portions 25a so as to approach the direction of flow A of the main flow. Thus, the intake air that has flowed out from the first and second edge portions 25a of the recess portion 25 merges smoothly with the intake air that flows through the flow tube 1, suppressing the generation of turbulence in the intake air that flows through the flow tube 1.

Next, results when average flow rate was measured using the present flow rate measuring apparatus 4 when a sinusoidal pulsating flow that is shown in FIG. 6 flowed through the flow tube 1 are shown in FIG. 7. Moreover, in FIG. 7, the vertical axis represents the difference between the correcting effect on the pulsation lean errors when a recess portion is not disposed and the correcting effect when a recess portion is disposed, and the horizontal axis represents an amplitude ratio (=Qamp/Qave/2). In FIG. 7, results observed under three kinds of pulsating conditions are shown. Here, the three kinds of pulsating conditions are: (1) Qave=10 g/s, f=25 Hz (pulsating conditions that correspond to a rotational speed 750 rpm in a four-cylinder engine); (2) Qave=20 g/s, f=50 Hz (pulsating conditions that correspond to a rotational speed 1,500 rpm in a four-cylinder engine); and (3) Qave=27 g/s, f=67 Hz (pulsating conditions that correspond to a rotational speed 2,000 rpm in a four-cylinder engine).

It can be seen from FIG. 7 that a larger correcting effect is achieved by forming the recess portion 25. Thus, loss at the inflow port 13 of the bypass passage 12 can be reduced by using the present flow rate measuring apparatus 4, enabling the correcting effect on pulsation lean errors by the bypass passage 12 to be satisfactorily enhanced.

Embodiment 2

Figure 8:
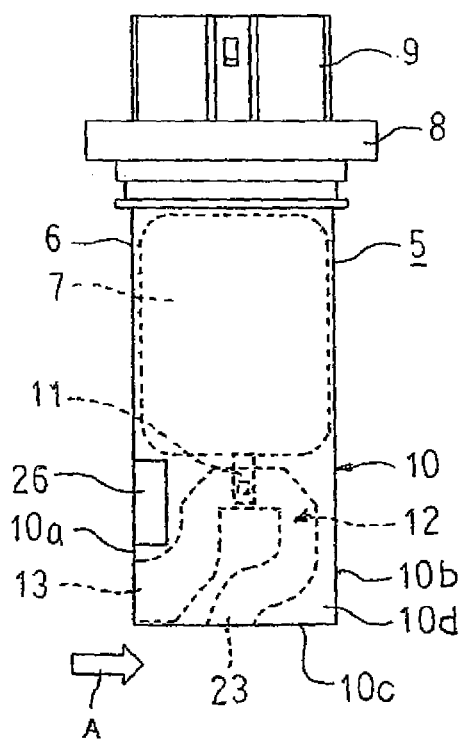
FIG. 8 is a side elevation of a flow rate measuring apparatus according to Embodiment 2 of the present invention.
Figure 9:
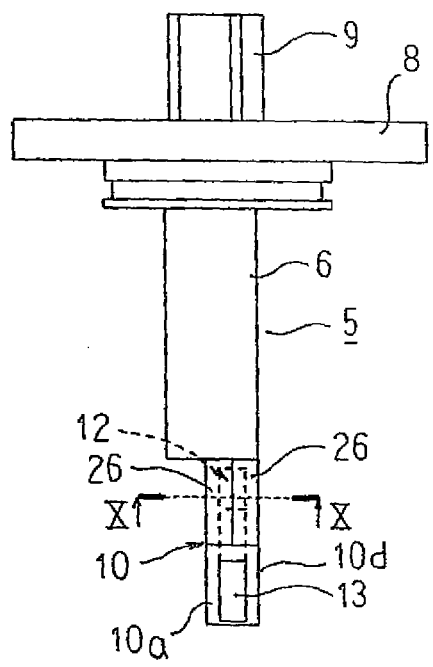
FIG. 9 is a front elevation of the flow rate measuring apparatus according to Embodiment 2 of the present invention.
Figure 10:
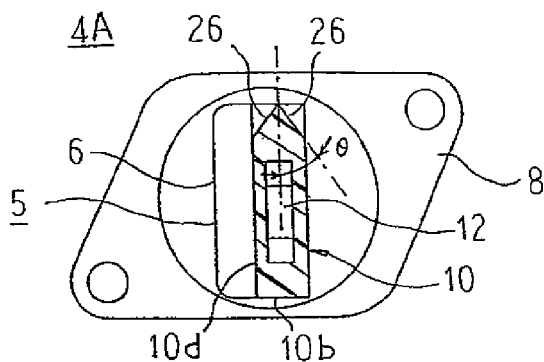
FIG. 10 is a cross section taken along line X-X in FIG. 9 viewed from the direction of the arrows.

FIG. 8 is a side elevation of a flow rate measuring apparatus according to Embodiment 2 of the present invention, FIG. 9 is a front elevation of the flow rate measuring apparatus according to Embodiment 2 of the present invention, and FIG. 10 is a cross section taken along line X-X in FIG. 9 viewed from the direction of the arrows.

In FIGS. 8 through 10, intersecting portions between a front surface 10a and side surfaces 10d of a bypass passage forming member 10 are relieved to form a pair of inclined surfaces 26 that function as a flow direction-changing means on the front surface 10a above an inflow port 13 so as to intersect at a central position in a horizontal direction of the bypass passage forming member 10 and at a position that is in a common plane with the front surface 10a. An angle $\theta$ that is formed between the inclined surfaces 26 and a direction of flow A of a main flow is an acute angle.

Moreover, Embodiment 2 is configured in a similar manner to Embodiment 1 above except for the fact that the pair of inclined faces 26 are formed instead of the recess portion 25.

In a flow rate measuring apparatus 4A that is configured in this manner, intake air that flows through the flow tube 1 and arrives at the front surface 10a of the bypass passage forming member 10 above the inflow port 13 is divided into two portions at the intersecting portion of the pair of inclined faces 26 and flows downstream along the respective inclined surfaces 26. Thus, the portion of intake air that has arrived at the front surface 10a above the inflow port 13 has its flow changed so as not to reach the inflow port 13, avoiding obstruction of the flow of intake air that flows directly into the inflow port 13.

Consequently, loss at the inflow port 13 of the bypass passage 12 can also be reduced in Embodiment 2, enabling the correcting effect on pulsation lean errors by the bypass passage 12 to be satisfactorily enhanced.

Because intake air that has arrived between the inflow port 13 and the circuit housing portion 6 flows downstream along the inclined surfaces 26, that intake air flows downstream without losing much flow velocity at all, also enabling pressure losses due to the flow rate measuring apparatus 4A to be reduced.

Embodiment 3

Figure 11:
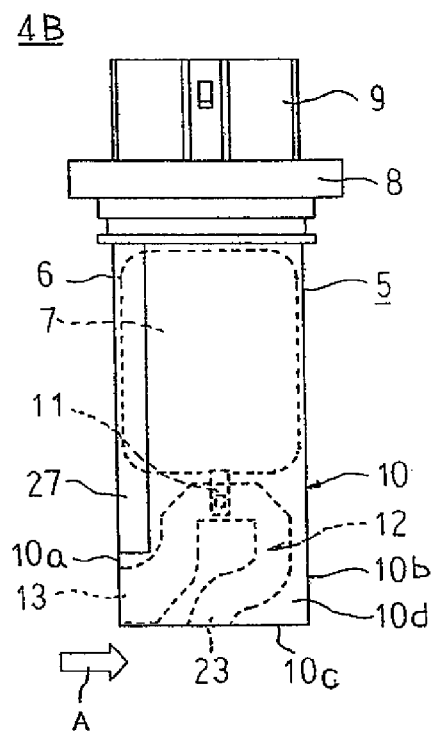
FIG. 11 is a side elevation of a flow rate measuring apparatus according to Embodiment 3 of the present invention.
Figure 12:
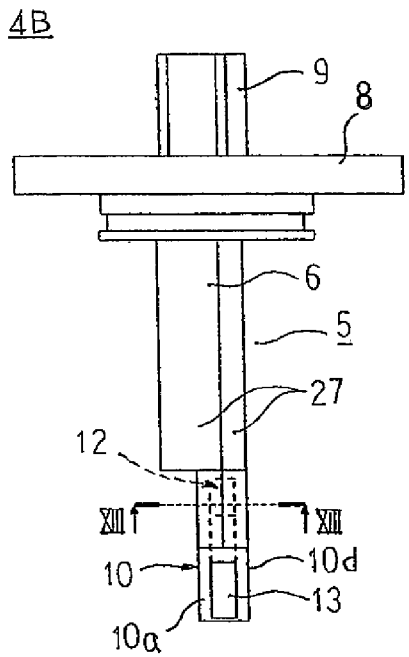
FIG. 12 is a front elevation of the flow rate measuring apparatus according to Embodiment 3 of the present invention.
Figure 13:
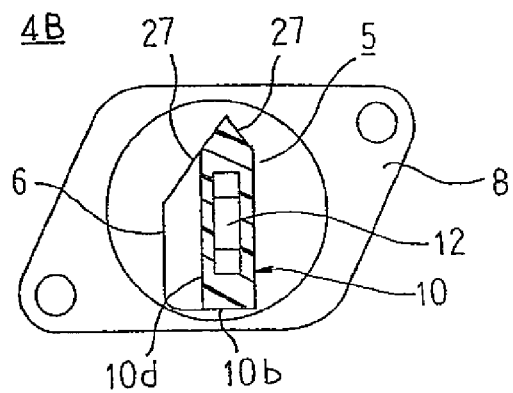
FIG. 13 is a cross section taken along line XIII-XIII in FIG. 12 viewed from the direction of the arrows.

FIG. 11 is a side elevation of a flow rate measuring apparatus according to Embodiment 3 of the present invention, FIG. 12 is a front elevation of the flow rate measuring apparatus according to Embodiment 3 of the present invention, and FIG. 13 is a cross section taken along line XIII-XIII in FIG. 12 viewed from the direction of the arrows.

In FIGS. 11 through 13, intersecting portions between a front surface 10a and side surfaces 10d of a bypass passage forming member 10 and also intersecting portions between a front surface and side surfaces of a circuit housing portion 6 are relieved to form a pair of inclined surfaces 27 that function as a flow direction-changing means on the front surface 10a above an inflow port 13 so as to intersect at a central position in a horizontal direction of the bypass passage forming member 10 at a position that is in a common plane with the front surface 10a. An angle that is formed between the inclined surfaces 27 and a direction of flow A of a main flow is an acute angle.

Moreover, Embodiment 3 is configured in a similar manner to Embodiment 2 above except for the fact that the pair of inclined faces 27 are formed instead of the pair of inclined faces 26.

In a flow rate measuring apparatus 4B that is configured in this manner, intake air that flows through the flow tube 1 and arrives at the front surface 10a of the bypass passage forming member 10 above the inflow port 13 or at the front surface of the circuit housing portion 6 is divided into two portions at the intersecting portion of the pair of inclined faces 27 and flows downstream along the respective inclined surfaces 27. Thus, the portion of intake air that has arrived above the inflow port 13 has its flow changed so as not to reach the inflow port 13, avoiding obstruction of the flow of intake air that flows directly into the inflow port 13.

Consequently, the correcting effect on pulsation lean errors by the bypass passage 12 can also be satisfactorily enhanced in Embodiment 3 in a similar manner to Embodiment 2 above, and pressure losses can also be reduced.

Embodiment 4

FIG. 14 is a side elevation of a flow rate measuring apparatus according to Embodiment 4 of the present invention, FIG. 15 is a front elevation of the flow rate measuring apparatus according to Embodiment 4 of the present invention, and FIG. 16 is a cross section taken along line XVI-XVI in FIG. 15 viewed from the direction of the arrows.

In FIGS. 14 through 16, intersecting portions between a front surface 10a and side surfaces 10d of a bypass passage forming member 10 are relieved to form a pair of inclined surfaces 28 that function as a flow direction-changing means on the front surface 10a on left and right sides of an inflow port 13. The inclined surfaces 28 intersect with opening edge portions of the inflow port 13. An angle that is formed between the inclined surfaces 28 and a direction of flow A of a main flow is an acute angle.

Moreover, Embodiment 4 is configured in a similar manner to Embodiment 1 above except for the fact that the pair of inclined faces 28 are formed instead of the recess portion 25.

In a flow rate measuring apparatus 4C that is configured in this manner, intake air that flows through the flow tube 1 and arrives at the front surface 10a of the bypass passage forming member 10 at the left or right side of the inflow port 13 flows downstream along the respective inclined surfaces 28. Thus, the portion of intake air that has arrived at the front surface 10a at the left or right side of the inflow port 13 has its flow changed so as not to reach the inflow port 13, avoiding obstruction of the flow of intake air that flows directly into the inflow port 13.

Consequently, the correcting effect on pulsation lean errors by the bypass passage 12 can also be satisfactorily enhanced in Embodiment 4 and pressure losses can also be reduced.

Moreover, in Embodiment 4 above, only the inclined surfaces 28 are formed on the front surface 10a, but any of the recess portion 25 or the inclined surfaces 26 and 27 according to Embodiments 1 through 3 above may also be disposed on the front surface 10a above the inflow port 13 in addition to the inclined surfaces 28.

Embodiment 5

Figure 17:
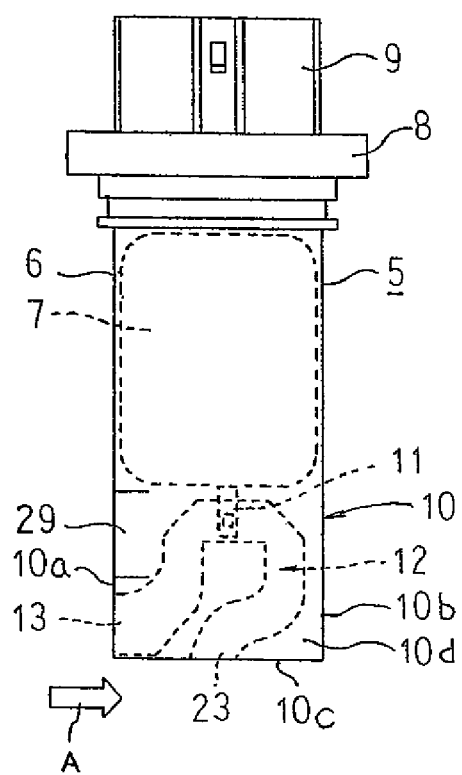
FIG. 17 is a side elevation of a flow rate measuring apparatus according to Embodiment 5 of the present invention.
Figure 18:
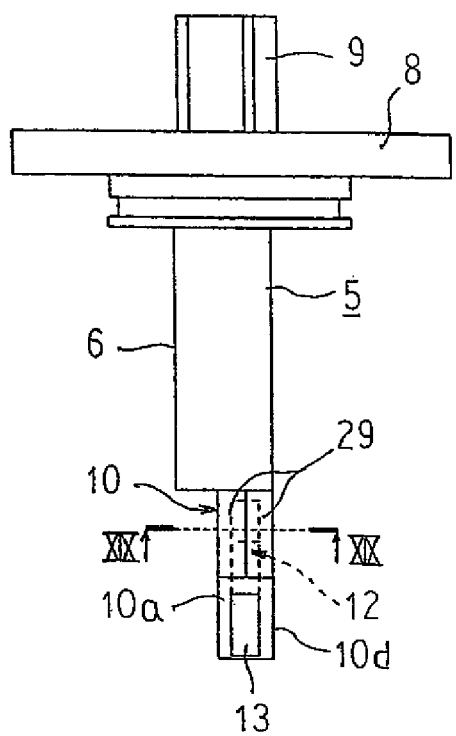
FIG. 18 is a front elevation of the flow rate measuring apparatus according to Embodiment 5 of the present invention.
Figure 19:
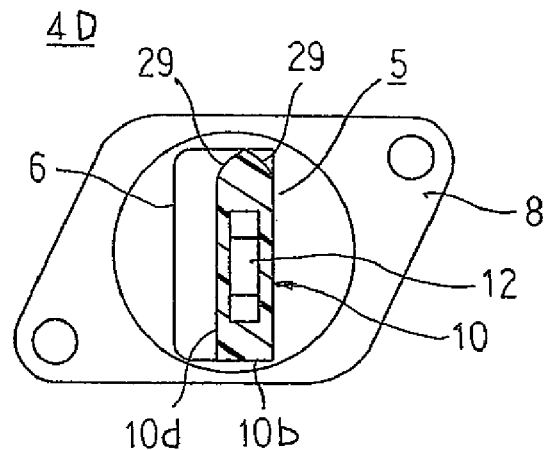
FIG. 19 is a cross section taken along line XIX-XIX in FIG. 18 viewed from the direction of the arrows.

FIG. 17 is a side elevation of a flow rate measuring apparatus according to Embodiment 5 of the present invention, FIG. 18 is a front elevation of the flow rate measuring apparatus according to Embodiment 5 of the present invention, and FIG. 19 is a cross section taken along line XIX-XIX in FIG. 18 viewed from the direction of the arrows.

In FIGS. 17 through 19, intersecting portions between a front surface 10a and side surfaces 10d of a bypass passage forming member 10 are relieved to form a pair of streamlined curved surfaces 29 that function as a flow direction-changing means on the front surface 10a above an inflow port 13 so as to intersect at a central position in a horizontal direction of the bypass passage forming member 10 at a position that is in a common plane with the front surface 10a.

Moreover, Embodiment 5 is configured in a similar manner to Embodiment 2 above except for the fact that the pair of streamlined curved surfaces 29 are formed instead of the pair of inclined faces 26.

In a flow rate measuring apparatus 4D that is configured in this manner, intake air that flows through the flow tube 1 and arrives at the front surface 10a of the bypass passage forming member 10 above the inflow port 13 is divided into two portions at the intersecting portion of the pair of streamlined curved surfaces 29 and flows downstream along the respective streamlined curved surfaces 29. Thus, the portion of intake air that has arrived at the front surface 10a above the inflow port 13 has its flow changed so as not to reach the inflow port 13, avoiding obstruction of the flow of intake air that flows directly into the inflow port 13.

Figure 20:
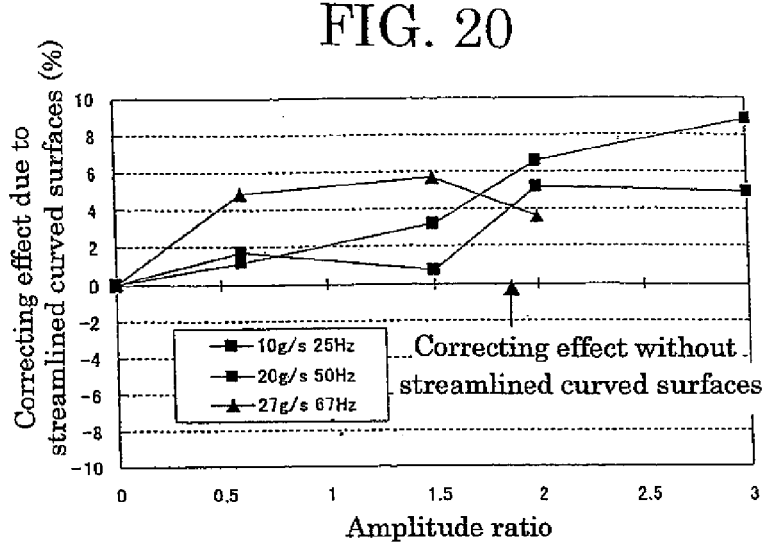
FIG. 20 is a graph that shows relationships between amplitude ratio and correcting effect in the flow rate measuring apparatus according to Embodiment 5 of the present invention.

Now, results when average flow rate was measured using the present flow rate measuring apparatus 4D when a pulsating flow flowed through the flow tube 1 are shown in FIG. 20. Moreover, in FIG. 20, the vertical axis represents the difference between the correcting effect on the pulsation lean errors when streamlined curved surfaces are not disposed and the correcting effect when streamlined curved surfaces are disposed, and the horizontal axis represents an amplitude ratio (=Qamp/Qave/2). In FIG. 20, results observed under three kinds of pulsating conditions are shown. Here, the three kinds of pulsating conditions are: (1) Qave=10 g/s, f=25 Hz (pulsating conditions that correspond to a rotational speed 750 rpm in a four-cylinder engine); (2) Qave=20 g/s, f=50 Hz (pulsating conditions that correspond to a rotational speed 1,500 rpm in a four-cylinder engine); and (3) Qave=27 g/s, f=67 Hz (pulsating conditions that correspond to a rotational speed 2,000 rpm in a four-cylinder engine).

It can be seen from FIG. 20 that a larger correcting effect is achieved by forming the streamlined curved surfaces 29.

Thus, the correcting effect on pulsation lean errors by the bypass passage 12 can also be satisfactorily enhanced in Embodiment 5 and pressure losses can also be reduced.

Moreover, in Embodiment 5 above, streamlined curved surfaces 29 are formed, but similar effects can also be achieved if arc-shaped curved surfaces are formed instead of the streamlined curved surfaces 29.

Embodiment 6

Figure 21:
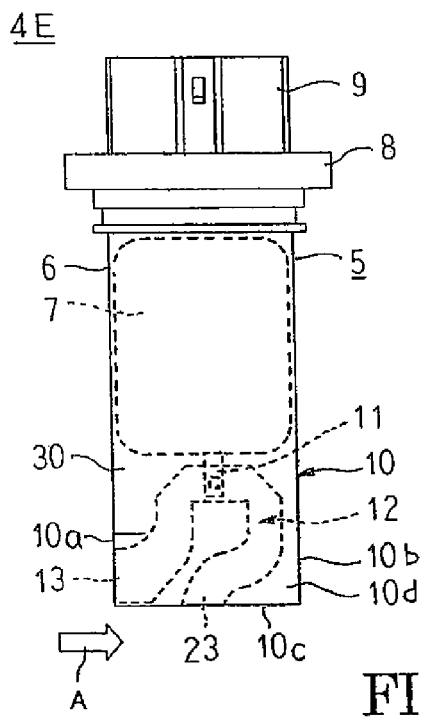
FIG. 21 is a side elevation of a flow rate measuring apparatus according to Embodiment 6 of the present invention.
Figure 22:
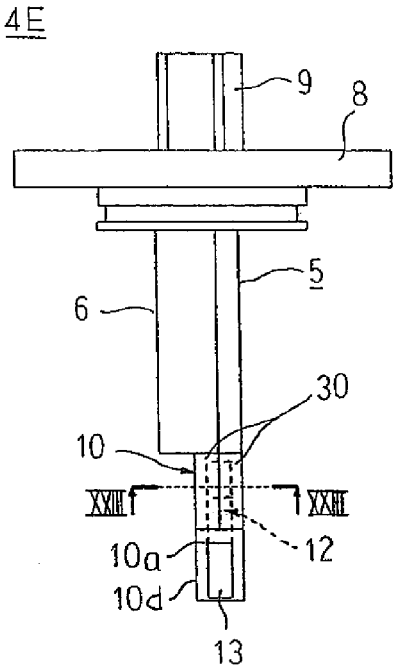
FIG. 22 is a front elevation of the flow rate measuring apparatus according to Embodiment 6 of the present invention.
Figure 23:
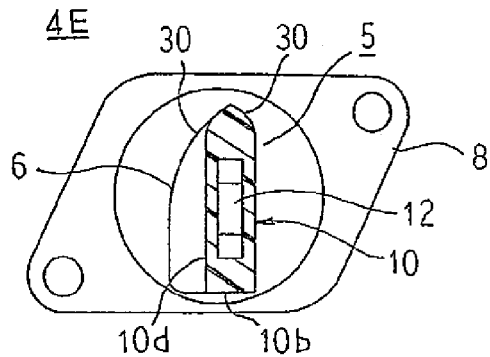
FIG. 23 is a cross section taken along line XXIII-XXIII in FIG. 22 viewed from the direction of the arrows.

FIG. 21 is a side elevation of a flow rate measuring apparatus according to Embodiment 6 of the present invention, FIG. 22 is a front elevation of the flow rate measuring apparatus according to Embodiment 6 of the present invention, and FIG. 23 is a cross section taken along line XXIII-XXIII in FIG. 22 viewed from the direction of the arrows.

In FIGS. 21 through 23, intersecting portions between a front surface 10a and side surfaces 10d of a bypass passage forming member 10 and also intersecting portions between a front surface and side surfaces of a circuit housing portion 6 are relieved to form a pair of streamlined curved surfaces 30 that function as a flow direction-changing means on the front surface 10a above an inflow port 13 so as to intersect at a central position in a horizontal direction of the bypass passage forming member 10 at a position that is in a common plane with the front surface 10a.

Moreover, Embodiment 6 is configured in a similar manner to Embodiment 5 above except for the fact that the pair of streamlined curved surfaces 30 are formed instead of the pair of streamlined curved surfaces 29.

In a flow rate measuring apparatus 4E that is configured in this manner, intake air that flows through the flow tube 1 and arrives at the front surface 10a of the bypass passage forming member 10 above the inflow port 13 or at the front surface of the circuit housing portion 6 is divided into two portions at the intersecting portion of the pair of streamlined curved surfaces 30 and flows downstream along the respective streamlined curved surfaces 30. Thus, the portion of intake air that has arrived above the inflow port 13 has its flow changed so as not to reach the inflow port 13, avoiding obstruction of the flow of intake air that flows directly into the inflow port 13.

Consequently, the correcting effect on pulsation lean errors by the bypass passage 12 can also be satisfactorily enhanced in Embodiment 6 in a similar manner to Embodiment 5 above, and pressure losses can also be reduced.

Moreover, in Embodiment 6 above, streamlined curved surfaces 30 are formed, but similar effects can also be achieved if arc-shaped curved surfaces are formed instead of the streamlined curved surfaces 30.

Embodiment 7

Figure 24:
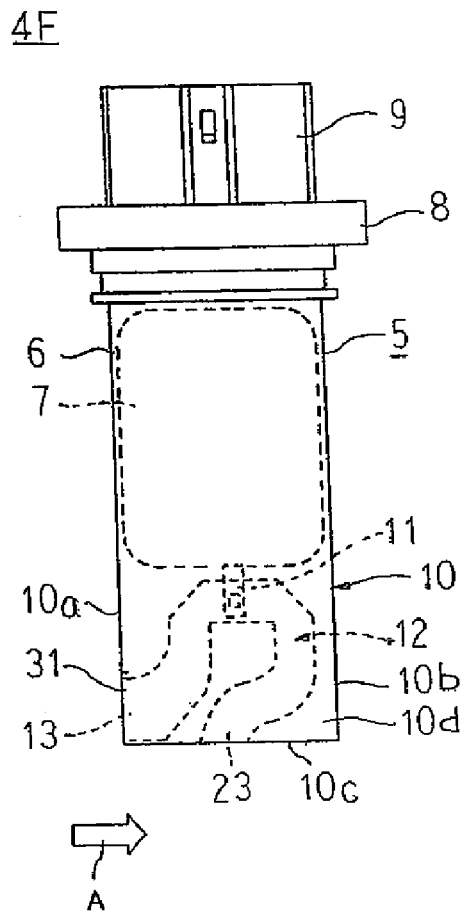
FIG. 24 is a side elevation of a flow rate measuring apparatus according to Embodiment 7 of the present invention.
Figure 25:
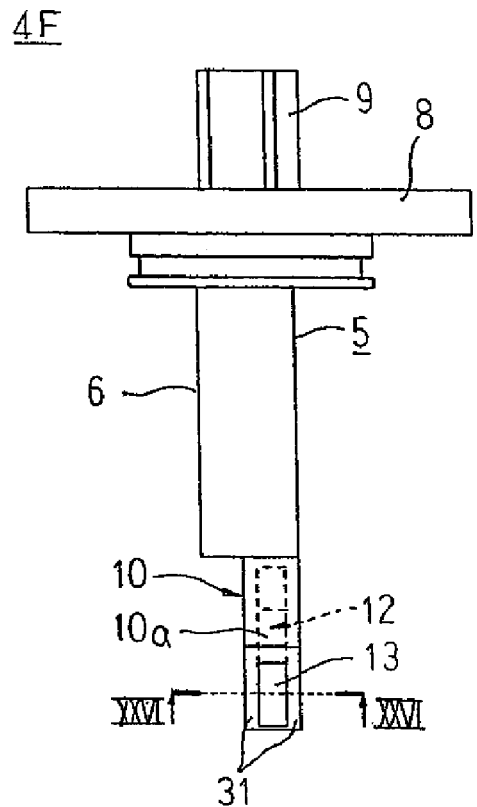
FIG. 25 is a front elevation of the flow rate measuring apparatus according to Embodiment 7 of the present invention.
Figure 26:
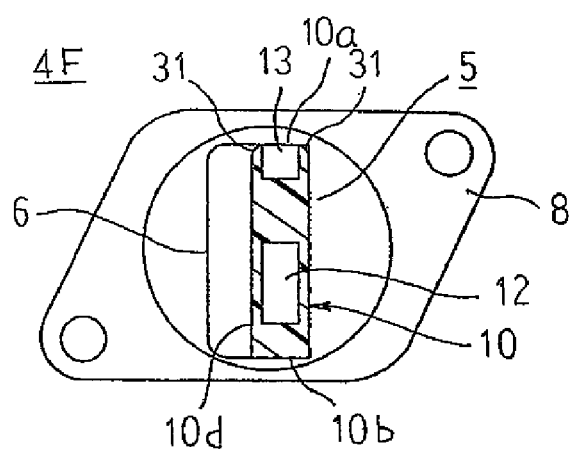
FIG. 26 is a cross section taken along line XXVI-XXVI in FIG. 25 viewed from the direction of the arrows.

FIG. 24 is a side elevation of a flow rate measuring apparatus according to Embodiment 7 of the present invention, FIG. 25 is a front elevation of the flow rate measuring apparatus according to Embodiment 7 of the present invention, and FIG. 26 is a cross section taken along line XXVI-XXVI in FIG. 25 viewed from the direction of the arrows.

In FIGS. 24 through 26, intersecting portions between a front surface 10a and side surfaces 10d of a bypass passage forming member 10 are relieved to form a pair of streamlined curved surfaces 31 that function as a flow direction-changing means on the front surface 10a on left and right sides of an inflow port 13. The streamlined curved surfaces 31 intersect with opening edge portions of the inflow port 13.

Moreover, Embodiment 7 is configured in a similar manner to Embodiment 4 above except for the fact that the pair of streamlined curved surfaces 31 are formed instead of the pair of inclined faces 28.

In a flow rate measuring apparatus 4F that is configured in this manner, intake air that flows through the flow tube 1 and arrives at the front surface 10a of the bypass passage forming member 10 at the left or right side of the inflow port 13 flows downstream along the respective streamlined curved surfaces 31. Thus, the portion of intake air that has arrived at the front surface 10a at the left or right side of the inflow port 13 has its flow changed so as not to reach the inflow port 13, avoiding obstruction of the flow of intake air that flows directly into the inflow port 13.

Consequently, the correcting effect on pulsation lean errors by the bypass passage 12 can also be satisfactorily enhanced in Embodiment 7 and pressure losses can also be reduced.

Moreover, in Embodiment 7 above, streamlined curved surfaces 31 are formed, but similar effects can also be achieved if arc-shaped curved surfaces are formed instead of the streamlined curved surfaces 31.

Embodiment 8

Figure 27:
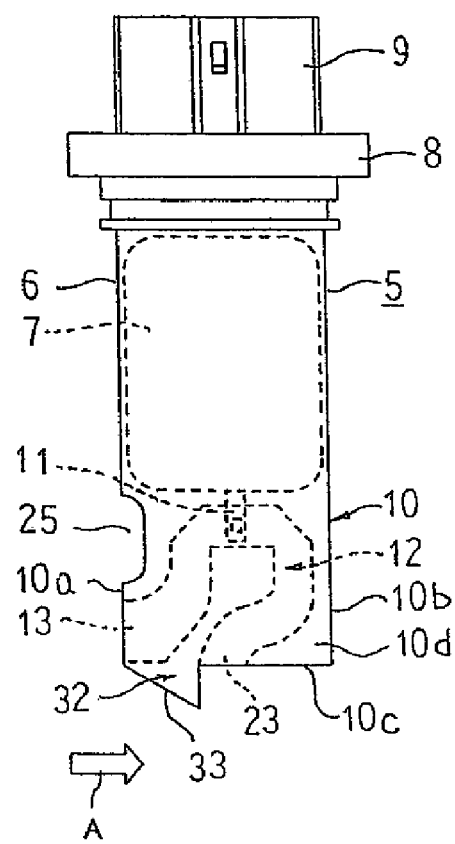
FIG. 27 is a side elevation of a flow rate measuring apparatus according to Embodiment 8 of the present invention.
Figure 28:
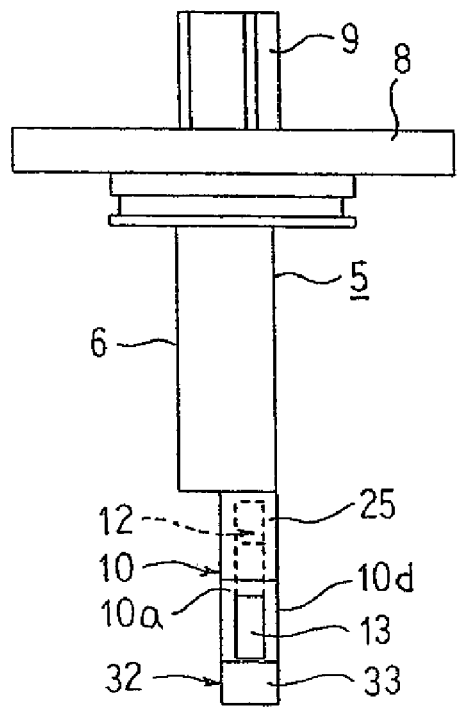
FIG. 28 is a front elevation of the flow rate measuring apparatus according to Embodiment 8 of the present invention.
Figure 29:
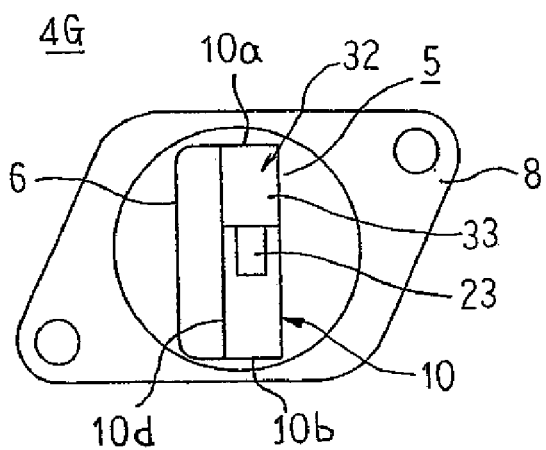
FIG. 29 is a bottom plan of the flow rate measuring apparatus according to Embodiment 8 of the present invention.

FIG. 27 is a side elevation of a flow rate measuring apparatus according to Embodiment 8 of the present invention, FIG. 28 is a front elevation of the flow rate measuring apparatus according to Embodiment 8 of the present invention, and FIG. 29 is a bottom plan of the flow rate measuring apparatus according to Embodiment 8 of the present invention. Moreover, a bottom plan is a view of the flow rate measuring apparatus from outside in a direction of extension of the bypass passage forming member from the circuit housing portion.

In FIGS. 27 through 29, a projecting portion 32 is disposed so as to protrude from a bottom surface 10c of a bypass passage forming member 10 between a front surface 10a and an outflow port 23 such that a projecting height from the bottom surface 10c gradually increases from an end near the front surface 10a toward a rear surface 10b. A bottom surface of the projecting portion 32 thereby forms an inclined surface 33 that is at an acute angle to a direction of flow A of a main flow.

Moreover, Embodiment 8 is configured in a similar manner to Embodiment 1 above except for the fact that the projecting portion 32 is disposed on the bottom surface 10c.

In a flow rate measuring apparatus 4G that is configured in this manner, intake air that flows through the flow tube 1 and arrives at the projecting portion 32 flows downstream along the inclined surface 33. Thus, the portion of intake air that has arrived at the projecting portion 32 has its flow changed so as not to reach the inflow port 13, avoiding obstruction of the flow of intake air that flows directly into the inflow port 13.

Because the inclined surface 33 is also inclined in a direction away from the outflow port 23, the intake air that flows along the inclined surface 33 flows in a direction away from the outflow port 23. Thus, the intake air that has finished flowing along the inclined surface 33 will not obstruct the flow of intake air that is discharged from the outflow port 23.

Consequently, in Embodiment 8, because loss reductions can be achieved at the outflow port 23 due to the inclined surface 33 of the projecting portion 32 in addition to loss reductions at the inflow port 13 due to the recess portion 25, the correcting effect on pulsation lean errors by the bypass passage 12 can be further enhanced.

Embodiment 9

Figure 30A:
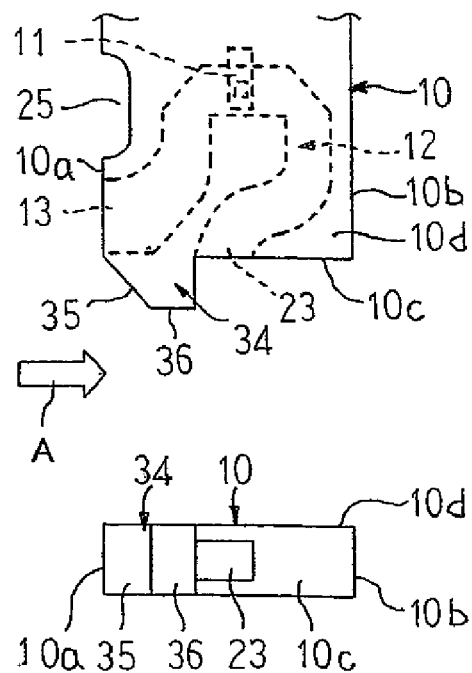
FIGS. 30A and 30B are diagrams that show a vicinity of a bypass passage forming member of a flow rate measuring apparatus according to Embodiment 9 of the present invention.
Figure 30B:
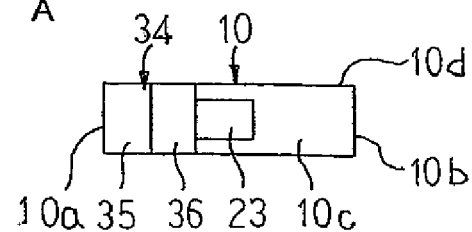

FIGS. 30A and 30B are diagrams that show a vicinity of a bypass passage forming member of a flow rate measuring apparatus according to Embodiment 9 of the present invention, FIG. 30A being a side elevation and FIG. 30B being a bottom plan.

In FIGS. 30A and 30B, a projecting portion 34 is disposed so as to protrude from a bottom surface 10c of a bypass passage forming member 10 between a front surface 10a and an outflow port 23 such that a projecting height from the bottom surface 10c gradually increases from an end near the front surface 10a toward a rear surface 10b and subsequently becomes constant. A bottom surface of the projecting portion 34 is thereby constituted by an inclined surface 35 that is at an acute angle to a direction of flow A of a main flow and a flat surface 36 that is parallel to the direction of flow A of the main flow downstream from the inclined surface 35.

Moreover, Embodiment 9 is configured in a similar manner to Embodiment 8 above except for the fact that the projecting portion 34 is disposed on the bottom surface 10c instead of the projecting portion 32.

In Embodiment 9, an angle that is formed between the inclined surface 35 of the projecting portion 34 and the direction of flow A of the main flow is greater than an angle that is formed between the inclined surface 33 of the projecting portion 32 and the direction of flow A of the main flow. Thus, because the intake air that flows along the inclined surface 335 flows in a direction further away from the outflow port 23, loss reductions are further increased at the outflow port 23 due to the inclined surface 35 of the projecting portion 34, enabling the correcting effect on pulsation lean errors by the bypass passage 12 to be further enhanced.

Embodiment 10

Figure 31A:
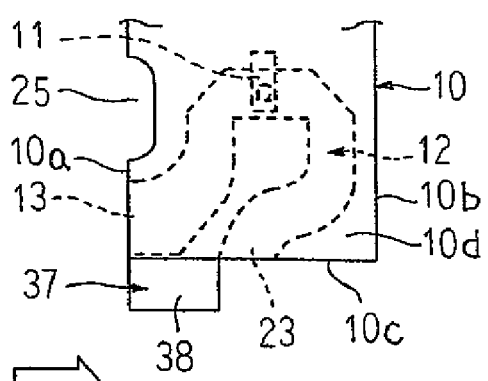
FIGS. 31A and 31B are diagrams that show a vicinity of a bypass passage forming member of a flow rate measuring apparatus according to Embodiment 10 of the present invention.
Figure 31B:
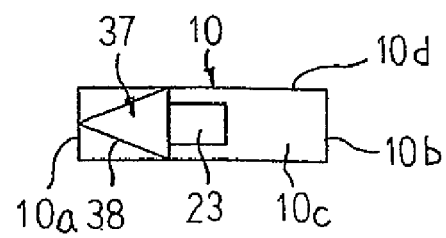

FIGS. 31A and 31B are diagrams that show a vicinity of a bypass passage forming member of a flow rate measuring apparatus according to Embodiment 10 of the present invention, FIG. 31A being a side elevation and FIG. 31B being a bottom plan.

In FIGS. 31A and 31B, a projecting portion 37 is disposed so as to protrude from a bottom surface 10c of a bypass passage forming member 10 between a front surface 10a and an outflow port 23 such that a projecting height from the bottom surface 10c is constant. First and second side surfaces of the projecting portion 37 are formed into inclined surfaces 38 that intersect at a central position in the horizontal direction of the projecting portion 37 at a position that is in a common plane with the front surface 10a, and that are at acute angles to a direction of flow A of a main flow.

Moreover, Embodiment 10 is configured in a similar manner to Embodiment 8 above except for the fact that the projecting portion 37 is disposed on the bottom surface 10c instead of the projecting portion 32.

In Embodiment 10, intake air that flows through the flow tube 1 and arrives at the projecting portion 37 is divided into two portions at the intersecting portion of the pair of inclined faces 38 and flows downstream along the respective inclined surfaces 38. Because the inclined surfaces 38 are inclined in directions away from the outflow port 23, the intake air that flows along the inclined surfaces 38 flows in directions away from the outflow port 23. Thus, the intake air that has finished flowing along the inclined surfaces 38 will not obstruct the flow of intake air that is discharged from the outflow port 23.

Consequently, in Embodiment 10, because loss reductions can be achieved at the outflow port 23 due to the inclined surfaces 38 of the projecting portion 37 in addition to loss reductions at the inflow port 13 due to the recess portion 25, the correcting effect on pulsation lean errors by the bypass passage 12 can be further enhanced.

Embodiment 11

Figure 32A:
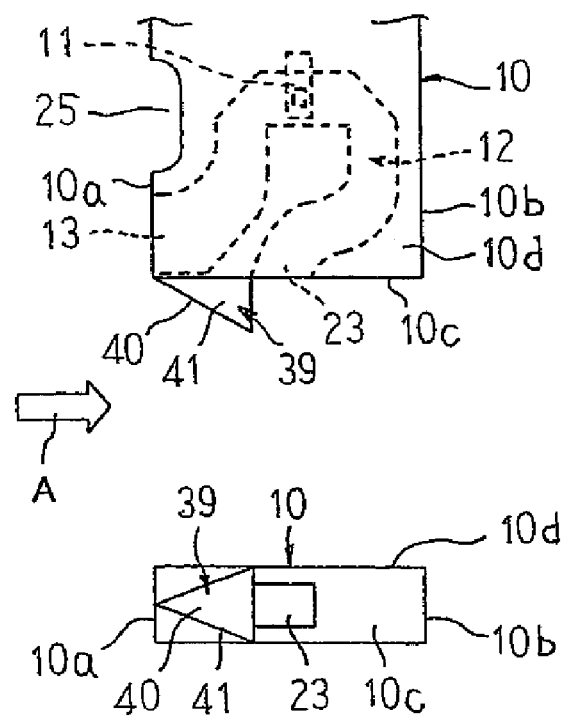
FIGS. 32A and 32B are diagrams that show a vicinity of a bypass passage forming member of a flow rate measuring apparatus according to Embodiment 11 of the present invention.
Figure 32B:
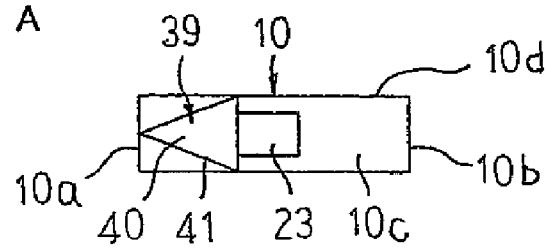

FIGS. 32A and 32B are diagrams that show a vicinity of a bypass passage forming member of a flow rate measuring apparatus according to Embodiment 11 of the present invention, FIG. 32A being a side elevation and FIG. 32B being a bottom plan.

In FIGS. 32A and 32B, a projecting portion 39 is disposed so as to protrude from a bottom surface 10c of a bypass passage forming member 10 between a front surface 10a and an outflow port 23 such that a projecting height from the bottom surface 10c gradually increases from an end near the front surface 10a toward a rear surface 10b. A bottom surface of the projecting portion 39 is thereby formed into an inclined surface 40 that is at an acute angle to a direction of flow A of a main flow. In addition, first and second side surfaces of the projecting portion 39 are formed into inclined surfaces 41 that intersect at a central position in the horizontal direction of the projecting portion 39 at a position that is in a common plane with the front surface 10a, and that are at acute angles to the direction of flow A of the main flow.

Moreover, Embodiment 11 is configured in a similar manner to Embodiment 8 above except for the fact that the projecting portion 39 is disposed on the bottom surface 10c instead of the projecting portion 32.

In Embodiment 11, intake air that flows through the flow tube 1 and arrives at the projecting portion 39 flows downstream along the respective inclined surfaces 40 and 41, which are inclined in directions away from the outflow port 23. Thus, the intake air that has finished flowing along the inclined surfaces 40 and 41 will not obstruct the flow of intake air that is discharged from the outflow port 23.

Consequently, the correcting effect on pulsation lean errors by the bypass passage 12 can also be further enhanced in Embodiment 11 in a similar manner to Embodiment 8 above.

Embodiment 12

Figure 33A:
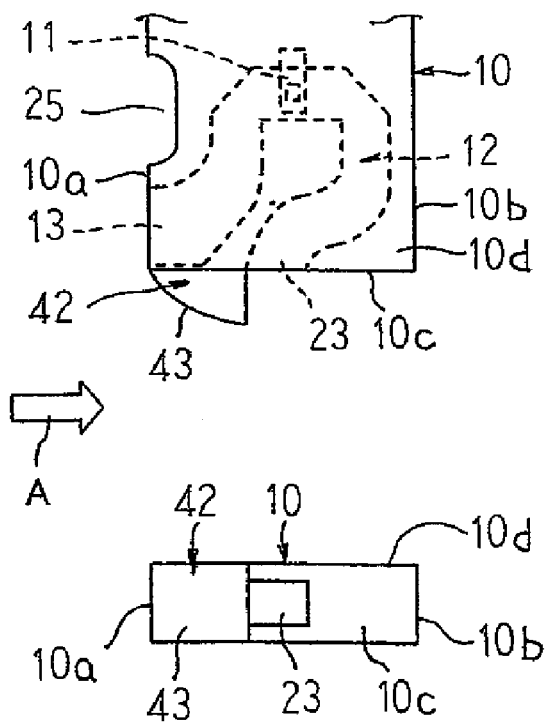
FIGS. 33A and 33B are diagrams that show a vicinity of a bypass passage forming member of a flow rate measuring apparatus according to Embodiment 12 of the present invention.
Figure 33B:
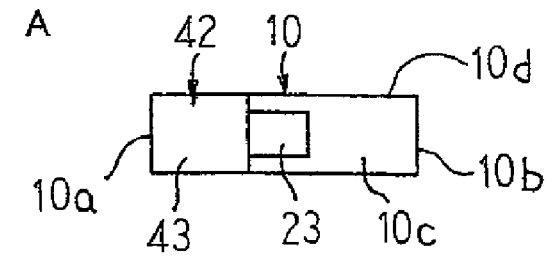

FIGS. 33A and 33B are diagrams that show a vicinity of a bypass passage forming member of a flow rate measuring apparatus according to Embodiment 12 of the present invention, FIG. 33A being a side elevation and FIG. 33B being a bottom plan.

In FIGS. 33A and 33B, a projecting portion 42 is disposed so as to protrude from a bottom surface 10c of a bypass passage forming member 10 between a front surface 10a and an outflow port 23 such that a projecting height from the bottom surface 10c gradually increases from an end near the front surface 10a toward a rear surface 10b. A bottom surface of the projecting portion 42 thereby forms a streamlined curved surface 43 that is streamlined relative to a direction of flow A of a main flow.

Moreover, Embodiment 12 is configured in a similar manner to Embodiment 8 above except for the fact that the projecting portion 42 is disposed on the bottom surface 10c instead of the projecting portion 32.

Now, results when average flow rate was measured using the present flow rate measuring apparatus when a sinusoidal pulsating flow flowed through the flow tube 1 are shown in FIG. 34. Moreover, in FIG. 34, the vertical axis represents the difference between the correcting effect on the pulsation lean errors when a projecting portion is not disposed and the correcting effect when a projecting portion that has a streamlined curved surface is disposed, and the horizontal axis represents an amplitude ratio (=Qamp/Qave/2). In FIG. 34, results observed under three kinds of pulsating conditions are shown, in a similar manner to Embodiment 1.

It can be seen from FIG. 34 that a larger correcting effect is achieved by disposing the projecting portion 42 that has the streamlined curved surface 43 as a bottom surface on the bottom surface 10c.

Thus, losses at the inflow port 13 and at the outflow port 23 can also be reduced in Embodiment 12, enabling the correcting effect on pulsation lean errors by the bypass passage 12 to be satisfactorily enhanced in a similar manner to Embodiment 8 above.

Embodiment 13

FIGS. 35A and 35B are diagrams that show a vicinity of a bypass passage forming member of a flow rate measuring apparatus according to Embodiment 13 of the present invention, FIG. 35A being a side elevation and FIG. 35B being a bottom plan.

In FIGS. 35A and 35B, a projecting portion 44 is disposed so as to protrude from a bottom surface 10c of a bypass passage forming member 10 between a front surface 10a and an outflow port 23 such that a projecting height from the bottom surface 10c is constant. First and second side surfaces of the projecting portion 44 are formed into streamlined curved surfaces 45 that intersect at a central position in the horizontal direction of the projecting portion 37 at a position that is in a common plane with the front surface 10a, and that are streamlined relative to a direction of flow A of a main flow.

Moreover, Embodiment 13 is configured in a similar manner to Embodiment 8 above except for the fact that the projecting portion 44 is disposed on the bottom surface 10c instead of the projecting portion 32.

In Embodiment 13, intake air that flows through the flow tube 1 and arrives at the projecting portion 44 is also divided into two portions at the intersecting portion of the pair of streamlined curved surfaces 45 and flows downstream along the respective streamlined curved surfaces 45. Thus, the intake air that has finished flowing along the streamlined curved surfaces 45 will not obstruct the flow of intake air that is discharged from the outflow port 23.

Consequently, the correcting effect on pulsation lean errors by the bypass passage 12 can also be enhanced in Embodiment 13 in a similar manner to Embodiment 8 above.

Embodiment 14

FIGS. 36A and 36B are diagrams that show a vicinity of a bypass passage forming member of a flow rate measuring apparatus according to Embodiment 14 of the present invention, FIG. 36A being a side elevation and FIG. 36B being a bottom plan.

In FIGS. 36A and 36B, a projecting portion 46 is disposed so as to protrude from a bottom surface 10c of a bypass passage forming member 10 between a front surface 10a and an outflow port 23 such that a projecting height from the bottom surface 10c gradually increases from an end near the front surface 10a toward a rear surface 10b. A bottom surface of the projecting portion 46 is thereby formed into an arc-shaped curved surface 47.

Moreover, Embodiment 14 is configured in a similar manner to Embodiment 8 above except for the fact that the projecting portion 46 is disposed on the bottom surface 10c instead of the projecting portion 32.

Now, results when average flow rate was measured using the present flow rate measuring apparatus when a sinusoidal pulsating flow flowed through the flow tube 1 are shown in FIG. 37. Moreover, in FIG. 37, the vertical axis represents the difference between the correcting effect on the pulsation lean errors when a projecting portion is not disposed and the correcting effect when a projecting portion that has an arc-shaped curved surface 47 is disposed, and the horizontal axis represents an amplitude ratio (=Qamp/Qave/2). In FIG. 37, results observed under three kinds of pulsating conditions are shown, in a similar manner to Embodiment 1. The radius of the arc-shaped curved surface 47 was 4 mm.

It can be seen from FIG. 37 that a larger correcting effect is achieved by disposing the projecting portion 46 that has the arc-shaped curved surface 47 as a bottom surface on the bottom surface 10c.

Thus, losses at the inflow port 13 and at the outflow port 23 can also be reduced in Embodiment 14, enabling the correcting effect on pulsation lean errors by the bypass passage 12 to be satisfactorily enhanced in a similar manner to Embodiment 8 above.

Figure 39:
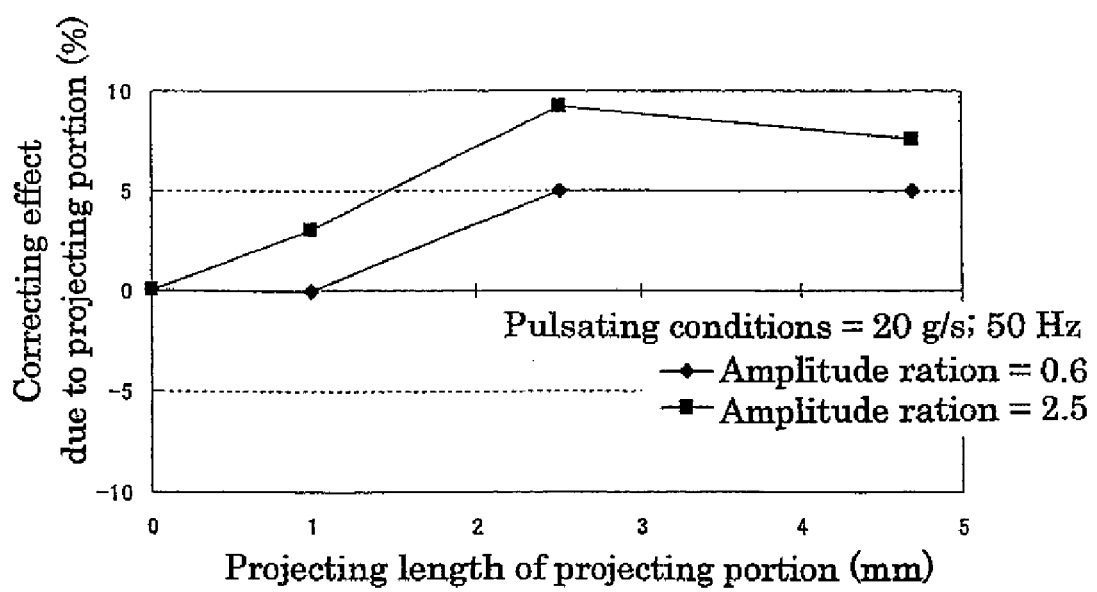
FIG. 39 is a graph that shows relationships between projecting height and correcting effect in the flow rate measuring apparatus according to Embodiment 14 of the present invention.

Next, results when correcting effect on pulsation lean errors was measured while changing projecting height x of the projecting portion 46 from the bottom surface 10c are shown in FIG. 39. Moreover, in FIG. 39, observed results are shown for two amplitude ratios (0.6 and 2.5) with the pulsating conditions fixed at 20 g/s and 50 Hz.

Figure 38:
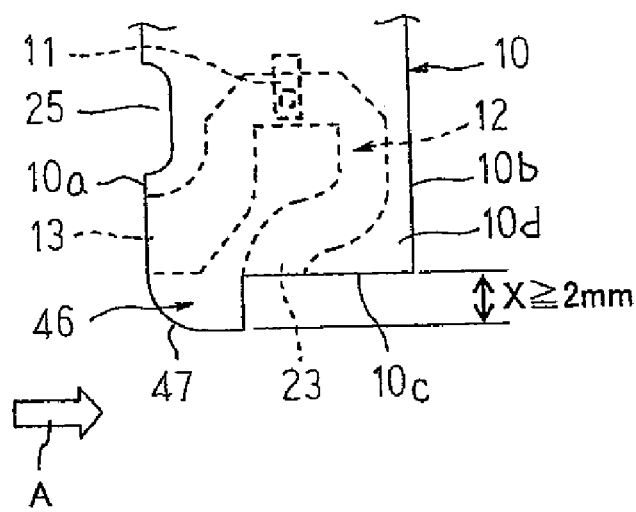
FIG. 38 is a diagram that explains a projecting height of a projecting portion in the bypass passage forming member of the flow rate measuring apparatus according to Embodiment 14 of the present invention.

From FIG. 39, it can be seen that the correcting effect on pulsation lean errors increases rapidly when the projecting height x of the projecting portion 46 exceeds 1 mm, and that the correcting effect on pulsation lean errors becomes approximately constant if the projecting height x of the projecting portion 46 exceeds 2.5 mm. From this, it is preferable for the projecting height x of the projecting portion 46 to be greater than or equal to 2.0 mm as shown in FIG. 38 in order to achieve a large correcting effect on pulsation lean errors reliably. The upper limit of the projecting height x of the projecting portion 46 must allow for a gap to be left between the bottom surface 10c of the bypass passage forming member 10 and the inner wall surface of the flow tube 1 so as to enable the flow rate measuring apparatus to be plugged into the flow tube 1. If the diameter of the flow tube 1 is 60 mm, for example, the upper limit of the projecting height x will be 21.25 mm. This is the value when 8.75 mm is subtracted from the radius of the flow tube 1, and the upper limit of the projecting height can be defined by this expression (x=the radius of flow tube−8.75 mm) even if a flow tube 1 that has a different diameter is used.

Moreover, in Embodiment 14 above, correcting effect on pulsation lean errors was measured while changing the projecting height x of the projecting portion 46, and results were obtained that showed that it is preferable for the projecting height x of the projecting portion 46 to be greater than or equal to 2.0 mm, but similar results were also obtained for Embodiments 8 through 13 above.

In Embodiments 8 through 14 above, a projecting portion is explained as being disposed on a bottom surface 10c of a bypass passage forming member 10 in which a recess portion 25 has been disposed on the front surface 10a, but similar effects can also be achieved if a projecting portion is disposed on a bottom surface 10c of a bypass passage forming member 10 in which an inclined surface 26, 27, or 28 or a streamlined curved surface 29, 30, or 31 according to Embodiments 2 through 7 has been disposed on the front surface 10a.

Embodiment 15

Figure 40:
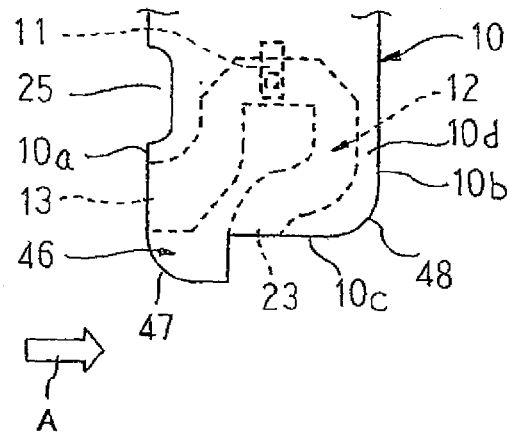
FIG. 40 is a side elevation of a vicinity of a bypass passage forming member of a flow rate measuring apparatus according to Embodiment 15 of the present invention.

FIG. 40 is a side elevation of a vicinity of a bypass passage forming member of a flow rate measuring apparatus according to Embodiment 15 of the present invention.

In FIG. 40, an arc-shaped curved surface 48 is formed by relieving into an arc shape a corner portion of a bypass passage forming member 10 at which a rear surface 10b and a bottom surface 10c intersect.

Moreover, the rest of this embodiment is configured in a similar manner to Embodiment 14 above.

Figure 41:
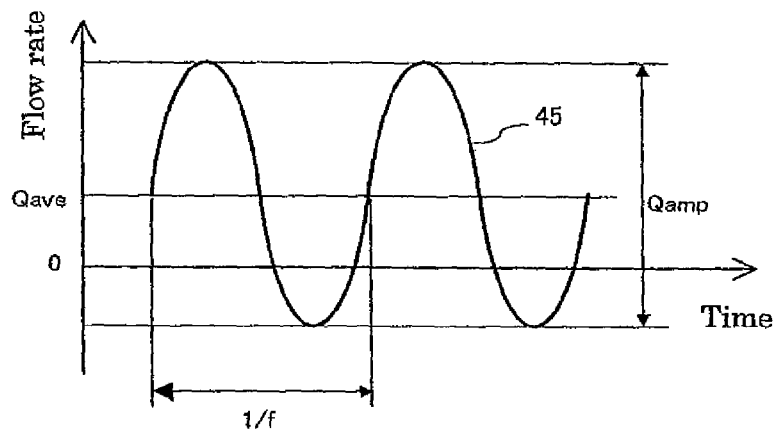
FIG. 41 is a graph that shows a waveform of a main flow during pulsation with reverse flow.

Now, if a sinusoidal pulsating flow 49 with a reverse flow such as that shown in FIG. 41 flows through the flow tube 1, a forward flow may still be occurring inside the bypass passage 12 due to a lag in pressure change inside the bypass passage 12.

In Embodiment 15, because the arc-shaped curved surface 48 is formed on an intersecting portion between the rear surface 10b and the bottom surface 10c of the bypass passage forming member 10, when the reverse flow reaches the arc-shaped curved surface 48, the reverse flow will flow along the arc-shaped curved surface 48 in a direction away from the outflow port 23 that is upstream. Thus, the reverse flow that flows along the arc-shaped curved surface 48 will not obstruct the forward flow of intake air that flows out of the outflow port 23.

Consequently, loss reducing effects at the outflow port 23 can be achieved in Embodiment 15 even during pulsation with a reverse flow, enabling the correcting effect on pulsation lean errors by the bypass passage 12 to be further enhanced.

Embodiment 16

Figure 42:
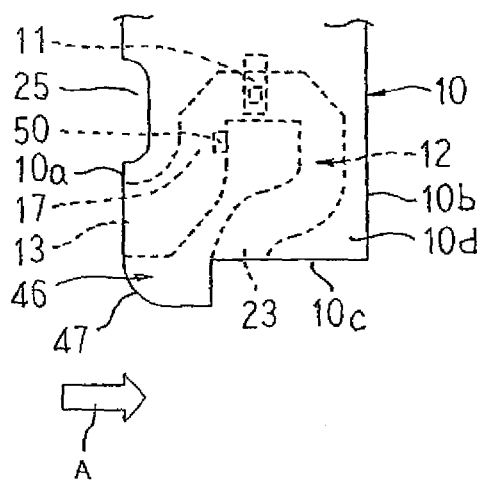
FIG. 42 is a side elevation of a vicinity of a bypass passage forming member of a flow rate measuring apparatus according to Embodiment 16 of the present invention.
Figure 43:
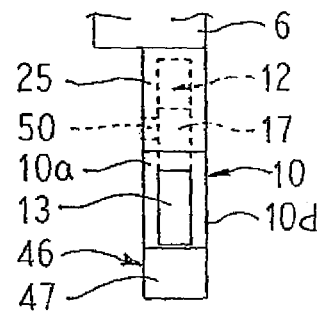
FIG. 43 is a front elevation of a vicinity of the bypass passage forming member of the flow rate measuring apparatus according to Embodiment 16 of the present invention.

FIG. 42 is a side elevation of a vicinity of a bypass passage forming member of a flow rate measuring apparatus according to Embodiment 16 of the present invention, and FIG. 43 is a front elevation of a vicinity of the bypass passage forming member of the flow rate measuring apparatus according to Embodiment 16 of the present invention.

In FIGS. 42 and 43, a first communicating aperture 50 is formed so as to communicate between a portion of a second passage portion 17 that is in close proximity to a wall surface at a downstream end in a direction of flow A of a main flow and a portion of a flow tube 1 at a side portion of a bypass passage forming member 10.

Moreover, the rest of this embodiment is configured in a similar manner to Embodiment 14 above.

Now, results when average flow rate was measured using the present flow rate measuring apparatus when a sinusoidal pulsating flow that is shown in FIG. 6 flowed through the flow tube 1 are shown in FIG. 44. Moreover, in FIG. 44, the vertical axis represents the difference between the correcting effect on the pulsation lean errors when a first communicating aperture is not disposed and the correcting effect when a first communicating aperture is disposed, and the horizontal axis represents an amplitude ratio (=Qamp/Qave/2). In FIG. 44, results observed under two kinds of pulsating conditions (Qave=10 g/s, f=25 Hz; and Qave=20 g/s, f=50 Hz) are shown.

It can be seen from FIG. 44 that a larger correcting effect is achieved by forming the first communicating aperture 50. Thus, the correcting effect on pulsation lean errors by the bypass passage 12 can be satisfactorily enhanced using Embodiment 16.

Embodiment 17

FIG. 45 is a side elevation of a vicinity of a bypass passage forming member of a flow rate measuring apparatus according to Embodiment 17 of the present invention, and FIG. 46 is a front elevation of a vicinity of the bypass passage forming member of the flow rate measuring apparatus according to Embodiment 17 of the present invention.

In FIGS. 45 and 46, a second communicating aperture 51 is formed so as to communicate between a vicinity of a wall surface at an upstream end of a third passage portion 21 in a direction of flow A of a main flow and a portion of a flow tube 1 at a side portion of a bypass passage forming member 10.

Moreover, the rest of this embodiment is configured in a similar manner to Embodiment 14 above.

If a flow rate measuring apparatus is mounted to and used in an internal combustion engine of an automobile, etc., rain or snow in external air, or water droplets from condensation, etc., may get into the flow tube 1. If such water droplets get into the bypass passage 12, there is a risk that they may stop and accumulate at eddy points that arise at the bend portions, changing the flow of intake air inside the bypass passage 12 and making the measuring characteristics of the flow rate measuring apparatus vary.

In the passage configuration of the present bypass passage 12, it has been confirmed that water droplets accumulate particularly easily on a wall surface in the third passage portion 21 immediately after the wall surface on an inner circumferential side of the third bend portion 18.

In Embodiment 17, because the second communicating aperture 51 is formed so as to communicate between the vicinity of the wall surface at the upstream end of the third passage portion 21 in the direction of flow A of the main flow and the portion of the flow tube 1 at the side portion of a bypass passage forming member 10, the second communicating aperture 51 is in close proximity immediately after the wall surface on the inner circumferential side of the third bend portion 18. Because the flow of intake air that flows through the flow tube 1 is higher than the flow of intake air that flows through the bypass passage 12, the intake air inside the bypass passage 12 is suctioned out through the second communicating aperture 51 to the flow tube 1. Thus, water droplets that accumulate immediately after the wall surface on the inner circumferential side of the third bend portion 18 are discharged through the second communicating aperture 51 to the flow tube 1 by this suction action. Accumulating water droplets can thereby be prevented from changing the flow of intake air inside the bypass passage 12, suppressing the occurrence fluctuations in the measuring characteristics of the flow rate measuring apparatus.

Figure 47:
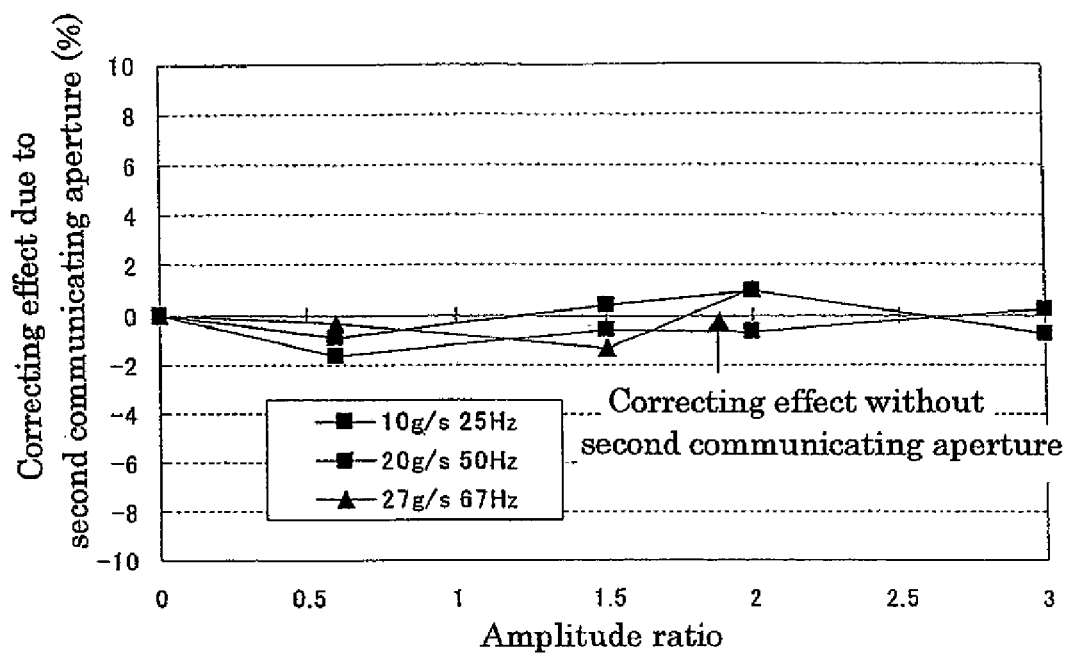
FIG. 47 is a graph that shows relationships between amplitude ratio and correcting effect in the flow rate measuring apparatus according to Embodiment 17 of the present invention.

Now, results when average flow rate was measured using the present flow rate measuring apparatus when a sinusoidal pulsating flow that is shown in FIG. 6 flowed through the flow tube 1 are shown in FIG. 47. Moreover, in FIG. 47, the vertical axis represents the difference between the correcting effect on the pulsation lean errors when a second communicating aperture is not disposed and the correcting effect when a second communicating aperture is disposed, and the horizontal axis represents an amplitude ratio (=Qamp/Qave/2). In FIG. 47, results observed under three kinds of pulsating conditions (Qave=10 g/s, f=25 Hz; Qave=20 g/s, f=50 Hz; and Qave=27 g/s, f=67 Hz) are shown.

It can be seen from FIG. 47 that a similar correcting effect on pulsation lean errors can also be achieved when the second communicating aperture 51 is disposed as when the second communicating aperture 51 is not disposed. That is, it can be seen that disposing second communicating aperture 51 does not have any adverse effect on the correcting effect on pulsation lean errors.

Thus, water resistance can be improved by disposing the second communicating aperture 51 that communicates with the main flow immediately after the third bend portion 18 without having any adverse effect on the correcting effect on pulsation lean errors.

Moreover, in Embodiment 17 above, a second communicating aperture is disposed on a flow rate measuring apparatus according to Embodiment 14 above, but a second communicating aperture may also be disposed on a flow rate measuring apparatus according to Embodiment 16 above.

Embodiment 18

Figure 48:
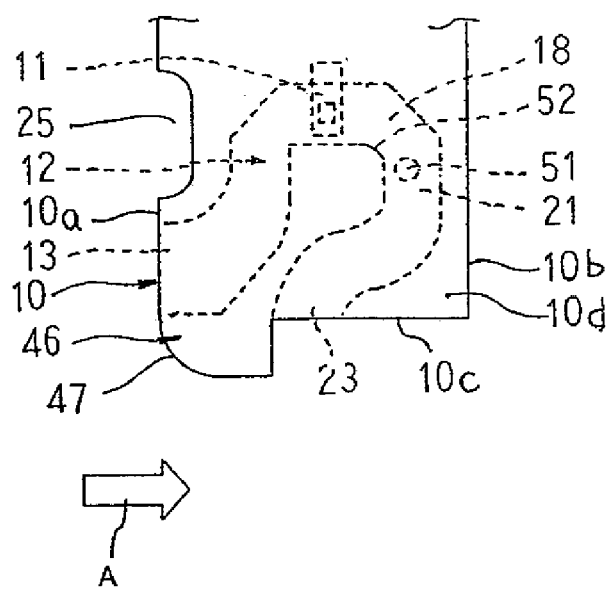
FIG. 48 is a side elevation of a vicinity of a bypass passage forming member of a flow rate measuring apparatus according to Embodiment 18 of the present invention.

FIG. 48 is a side elevation of a vicinity of a bypass passage forming member of a flow rate measuring apparatus according to Embodiment 18 of the present invention.

In FIG. 48, a corner portion on an inner circumferential side of a third bend portion 18 is formed into an arc-shaped curved surface 52.

Moreover, the rest of this embodiment is configured in a similar manner to Embodiment 17 above.

In Embodiment 18, because the corner portion on the inner circumferential side of the third bend portion 18 is formed into the arc-shaped curved surface 52, water droplets that pass through along the wall surface on the inner circumferential side of the third bend portion 18 are more easily led to the second communicating aperture 51.

Thus, according to Embodiment 18, because water droplets are more easily discharged through the second communicating aperture 51, water resistance can be improved further.

What is claimed is:

1. A flow rate measuring apparatus comprising:
   a main body portion comprising:
      a circuit housing portion that projects into a main passage; and
      a bypass passage forming member that is disposed so as to extend from a projecting end of said circuit housing portion in a direction of projection of said circuit housing portion;
   a bypass passage that is formed on said bypass passage forming member and through which a portion of a measured fluid that flows through said main passage is allowed to flow;
   a flow rate detecting element that is disposed inside said bypass passage and that has a detecting portion on a surface; and
   a control circuit that is housed inside said circuit housing portion and that drives said flow rate detecting element and processes a signal therefrom,
   wherein:
   said bypass passage forming member has:
      a front surface that is oriented upstream with respect to a direction of a main flow of said measured fluid and that is perpendicular to said direction of said main flow;
      a bottom surface that is positioned at a leading end in a direction of extension from said circuit housing portion and that is parallel to said direction of said main flow;

two side surfaces that intersect with said front surface and said bottom surface; and a flow direction-changing means, formed on said front surface of said bypass passage forming member, for making said measured fluid, that collides with said front surface of said bypass passage forming member, flow in a horizontal direction that is perpendicular with respect to both (i) said direction of said main flow and (ii) said direction of projection of said bypass passage forming member;

said bypass passage has:
an inflow port that has an opening in a vicinity of an end portion of said front surface of said bypass passage forming member in said direction of extension of said bypass passage forming member; and
an outflow port that has an opening on said bottom surface of said bypass passage forming member; and the flow direction-changing means comprising a pair of inclined surfaces formed by relieving intersecting portions between said front surface and said side surfaces of said bypass passage forming member, the pair of inclined surfaces intersecting each other at a position that is in a common plane with said front surface, extending in said direction of projection of said bypass passage forming member for a predetermined range and extending over an entire region of said front surface of said bypass passage forming member in the horizontal direction, the flow direction-changing means making the measured fluid that collides with the front surface of said bypass passage forming member within said pair of inclined surfaces formed by the relieving intersecting portions to flow in the horizontal direction.

2. A flow rate measuring apparatus according to claim 1, further comprising a projecting portion that projects in said direction of extension of said bypass passage forming member on a portion of said bottom surface of said bypass passage forming member upstream from said outflow port in said direction of said main flow, wherein said projecting portion is configured so as to have an external shape that changes a flow of said measured fluid that has arrived at said projecting portion away from said outflow port.

3. A flow rate measuring apparatus according to claim 2, wherein at least a portion of said external shape of said projecting portion that changes said flow of said measured fluid that has arrived at said projecting portion away from said outflow port is constituted by an inclined surface that is at an acute angle to said direction of flow of said main flow.

4. A flow rate measuring apparatus according to claim 2, wherein at least a portion of said external shape of said projecting portion that changes said flow of said measured fluid that has arrived at said projecting portion away from said outflow port is constituted by a curved surface that is streamlined relative to said direction of said main flow or that is arc shaped.

5. A flow rate measuring apparatus according to claim 2, wherein a projecting height of said projecting portion from said bottom surface of said bypass passage forming member is greater than or equal to 2 mm.

6. A flow rate measuring apparatus according to claim 2, wherein:

said bypass passage forming member has a rear surface that is oriented downstream with respect to said direction of said main flow from said front surface, and that is perpendicular to said direction of said main flow; and an intersecting portion between said bottom surface and said rear surface of said bypass passage forming member is constituted by a streamlined or arc-shaped curved surface.

7. A flow rate measuring apparatus according to claim 1, wherein:

said bypass passage comprises:
a first passage portion that extends from said inflow port in said direction of said main flow to a first bend portion;
a second passage portion that extends from said first bend portion in a direction perpendicular to said direction of said main flow toward said circuit housing portion to a second bend portion;
a third passage portion that extends from said second bend portion in said direction of said main flow to a third bend portion;
a fourth passage portion that extends from said third bend portion in a direction perpendicular to said direction of said main flow away from said circuit housing portion; and
a fifth passage portion that extends from said fourth passage portion in a direction that is opposite to said direction of said main flow and is connected to said outflow port; and a first communicating aperture is disposed through said bypass passage forming member so as to communicate between a portion of said second passage portion at a downstream end in said direction of said main flow and said main passage.

8. A flow rate measuring apparatus according to claim 7, wherein a second communicating aperture is disposed through said bypass passage forming member so as to communicate between a portion of said fourth passage portion at an upstream end in said direction of said main flow and said main passage.

9. A flow rate measuring apparatus according to claim 1, wherein:

said bypass passage comprises:
a first passage portion that extends from said inflow port in said direction of said main flow to a first bend portion;
a second passage portion that extends from said first bend portion in a direction perpendicular to said direction of said main flow toward said circuit housing portion to a second bend portion;
a third passage portion that extends from said second bend portion in said direction of said main flow to a third bend portion;
a fourth passage portion that extends from said third bend portion in a direction perpendicular to said direction of said main flow away from said circuit housing portion; and
a fifth passage portion that extends from said fourth passage portion in a direction that is opposite to said direction of said main flow and is connected to said outflow port; and a communicating aperture is disposed through said bypass passage forming member so as to communicate between a portion of said fourth passage portion at an upstream end in said direction of said main flow and said main passage.

10. A flow rate measuring apparatus according to claim 9, wherein a corner portion on an inner circumferential side of said third bend portion is formed so as to have an arc shape.

* * * * *